(12) United States Patent
Phelan et al.

(10) Patent No.: US 9,421,982 B2
(45) Date of Patent: Aug. 23, 2016

(54) MOTOR VEHICLE OPERATING DATA COLLECTION AND ANALYSIS

(71) Applicant: Allstate Insurance Company, Northbrook, IL (US)

(72) Inventors: Joseph Patrick Phelan, St. Lucia (AU); Johannes A. Perquin, The Woodlands, TX (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/982,937

(22) Filed: Dec. 29, 2015

(65) Prior Publication Data

US 2016/0114807 A1  Apr. 28, 2016

Related U.S. Application Data

(63) Continuation of application No. 14/310,818, filed on Jun. 20, 2014, now Pat. No. 9,269,202, which is a continuation of application No. 11/921,192, filed as application No. PCT/US2005/019279 on Jun. 1, 2005, now Pat. No. 9,189,895.

(51) Int. Cl.
| | |
|---|---|
| *B60W 40/09* | (2012.01) |
| *G06Q 40/00* | (2012.01) |
| *G06F 17/00* | (2006.01) |
| *G09B 19/16* | (2006.01) |
| *G06Q 40/08* | (2012.01) |
| *G07C 5/08* | (2006.01) |
| *G08G 1/00* | (2006.01) |
| *G07C 5/00* | (2006.01) |
| *G07C 5/02* | (2006.01) |
| *G08B 21/18* | (2006.01) |
| *G08G 1/052* | (2006.01) |
| *G08G 1/01* | (2006.01) |

(52) U.S. Cl.
CPC ............... *B60W 40/09* (2013.01); *G06F 17/00* (2013.01); *G06Q 40/00* (2013.01); *G06Q 40/08* (2013.01); *G07C 5/008* (2013.01); *G07C 5/02* (2013.01); *G07C 5/0841* (2013.01); *G08G 1/20* (2013.01); *G09B 19/167* (2013.01); *B60W 2520/105* (2013.01); *B60W 2530/14* (2013.01); *B60W 2550/402* (2013.01); *G08B 21/182* (2013.01); *G08G 1/0104* (2013.01); *G08G 1/052* (2013.01)

(58) Field of Classification Search
CPC .......... B60W 40/09; B60W 2520/105; B60W 2550/402; G07C 5/02; G07C 5/0841; G07C 5/008; G06Q 40/08; G06Q 40/00; G09B 19/167; G06F 17/00; G08G 1/20
See application file for complete search history.

(56) References Cited

U.S. PATENT DOCUMENTS

| | | | |
|---|---|---|---|
| 2002/0111725 A1* | 8/2002 | Burge | G06Q 40/08 701/31.4 |
| 2003/0130893 A1* | 7/2003 | Farmer | G06Q 30/0266 705/14.63 |
| 2003/0216889 A1* | 11/2003 | Marko | G07C 5/0808 702/182 |

(Continued)

*Primary Examiner* — Rodney Butler
(74) *Attorney, Agent, or Firm* — Banner & Witcoff, Ltd.

(57) ABSTRACT

A method and apparatus for collecting and evaluating powered vehicle operation utilizing on-board diagnostic components and location determining components or systems. The invention creates one or more databases whereby identifiable behavior or evaluative characteristics can be analyzed or categorized. The evaluation can include predicting likely future events. The database can be correlated or evaluated with other databases for a wide variety of uses.

20 Claims, 29 Drawing Sheets

(56) References Cited

U.S. PATENT DOCUMENTS

| | | | | |
|---|---|---|---|---|
| 2004/0153362 A1* | 8/2004 | Bauer | ................... | G06Q 40/02 705/4 |
| 2004/0230370 A1* | 11/2004 | Tzamaloukas | ..... | G01C 21/3492 701/400 |
| 2004/0235516 A1* | 11/2004 | Otsuki | ................ | B60R 25/1004 455/552.1 |
| 2004/0236596 A1* | 11/2004 | Chowdhary | ....... | G06Q 30/0601 705/26.1 |
| 2005/0096836 A1* | 5/2005 | Minami | ................... | G08G 1/20 701/123 |
| 2005/0203683 A1* | 9/2005 | Olsen | ................... | B60R 25/1004 701/29.3 |
| 2005/0240343 A1* | 10/2005 | Schmidt | ................. | G07C 5/008 701/414 |
| 2006/0136105 A1* | 6/2006 | Larson | ................... | G06Q 10/06 701/29.5 |
| 2006/0261933 A1* | 11/2006 | Deniau | ................... | G07C 5/008 340/426.15 |
| 2008/0270519 A1* | 10/2008 | Ekdahl | ................... | G07C 5/008 709/203 |

* cited by examiner

Trip Violations

Trip 2 December 29, 2003    Traffic Violations 82.99 82.99 DSR without persistent events: DSR:

| Start Time | End Time | Type | Description | | Severity |
|---|---|---|---|---|---|
| 1:55:29 PM | 1:55:33 PM | Speed limit | 1-5 MPH over-Speed limit: | 25MPH, speed: 27MPH | 1 |
| 1:55:35 PM | 1:55:39 PM | Speed limit | 5-10 MPH over-Speed limit: | 25MPH, speed: 31MPH | 2 |
| 1:55:41 PM | 1:56:03 PM | Speed limit | 1-5 MPH over-Speed limit: | 25MPH, speed: 30MPH | 1 |
| 1:56:17 PM | 1:56:17 PM | Speed limit | 1-5 MPH over-Speed limit: | 25MPH, speed: 27MPH | 1 |
| 1:56:19 PM | 1:56:21 PM | Speed limit | 5-10 MPH over-Speed limit: | 25MPH, speed: 31MPH | 2 |
| 1:56:23 PM | 1:56:27 PM | Speed limit | 10-15 MPH over-Speed limit: | 25MPH, speed: 36MPH | 3 |
| 1:56:29 PM | 1:56:33 PM | Speed limit | 5-10 MPH over-Speed limit: | 25MPH, speed: 35MPH | 2 |
| 1:56:35 PM | 1:56:37 PM | Speed limit | 10-15 MPH over-Speed limit: | 25MPH, speed: 36MPH | 3 |
| 1:56:39 PM | 1:56:39 PM | Speed limit | 5-10 MPH over-Speed limit: | 25MPH, speed: 35MPH | 2 |
| 1:56:41 PM | 1:56:47 PM | Speed limit | 10-15 MPH over-Speed limit: | 25MPH, speed: 36MPH | 3 |
| 1:56:49 PM | 1:56:55 PM | Speed limit | 15-20 MPH over-Speed limit: | 25MPH, speed: 44MPH | 4 |
| 1:56:57 PM | 1:56:57 PM | Speed limit | 10-15 MPH over-Speed limit: | 25MPH, speed: 35MPH | 3 |
| 1:56:59 PM | 1:57:01 PM | Speed limit | 1-5 MPH over-Speed limit: | 25MPH, speed: 27MPH | 1 |
| 1:57:03 PM | 1:57:03 PM | Speed limit | 5-10 MPH over-Speed limit: | 25MPH, speed: 35MPH | 2 |
| 1:57:05 PM | 1:57:07 PM | Speed limit | 15-20 MPH over-Speed limit: | 25MPH, speed: 41MPH | 4 |
| 1:57:09 PM | 1:57:29 PM | Speed limit | 20+ MPH over-Speed limit: | 25MPH, speed: 50MPH | 5 |
| 1:57:31 PM | 1:57:45 PM | Speed limit | 15-20 MPH over-Speed limit: | 25MPH, speed: 44MPH | 4 |
| 1:57:47 PM | 1:57:47 PM | Speed limit | 5-10 MPH over-Speed limit: | 25MPH, speed: 35MPH | 2 |
| 1:57:59 PM | 1:57:59 PM | Speed limit | 1-5 MPH over-Speed limit: | 15MPH, speed: 16MPH | 1 |
| 2:05:07 PM | 2:05:07 PM | Speed limit | 1-5 MPH over-Speed limit: | 25MPH, speed: 29MPH | 1 |

FIG. 19A

| | | | | |
|---|---|---|---|---|
| 2:05:09 PM | 2:05:09 PM | Speed limit | 10-15 MPH over-Speed limit: 25MPH, speed: 37MPH | 3 |
| 2:05:11 PM | 2:05:11 PM | Speed limit | 15-20 MPH over-Speed limit: 25MPH, speed: 44MPH | 4 |
| 2:05:13 PM | 2:05:21 PM | Speed limit | 20+ MPH over-Speed limit: 25MPH, speed: 47MPH | 5 |
| 2:05:23 PM | 2:05:31 PM | Speed limit | 15-20 MPH over-Speed limit: 25MPH, speed: 45MPH | 4 |
| 2:05:33 PM | 2:05:45 PM | Speed limit | 20+ MPH over-Speed limit: 25MPH, speed: 46MPH | 5 |
| 2:05:47 PM | 2:05:49 PM | Speed limit | 15-20 MPH over-Speed limit: 25MPH, speed: 45MPH | 4 |
| 2:05:51 PM | 2:05:59 PM | Speed limit | 20+ MPH over-Speed limit: 25MPH, speed: 47MPH | 5 |
| 2:06:01 PM | 2:06:01 PM | Speed limit | 15-20 MPH over-Speed limit: 25MPH, speed: 42MPH | 4 |
| 2:06:03 PM | 2:06:03 PM | Speed limit | 10-15 MPH over-Speed limit: 25MPH, speed: 36MPH | 3 |
| 2:06:05 PM | 2:06:05 PM | Speed limit | 5-10 MPH over-Speed limit: 25MPH, speed: 31MPH | 2 |
| 2:06:37 PM | 2:06:37 PM | Speed limit | 1-5 MPH over-Speed limit: 25MPH, speed: 27MPH | 1 |
| 2:06:39 PM | 2:06:39 PM | Speed limit | 5-10 MPH over-Speed limit: 25MPH, speed: 31MPH | 2 |
| 2:06:41 PM | 2:06:47 PM | Speed limit | 10-15 MPH over-Speed limit: 25MPH, speed: 36MPH | 3 |
| 2:06:49 PM | 2:06:59 PM | Speed limit | 15-20 MPH over-Speed limit: 25MPH, speed: 41MPH | 4 |
| 2:07:03 PM | 2:07:45 PM | Speed limit | 20+ MPH over-Speed-limit: 25MPH, speed: 49MPH | 5 |
| 2:07:47 PM | 2:08:11 PM | Speed limit | 15-20 MPH over-Speed limit: 25MPH, speed: 45MPH | 4 |
| 2:08:13 PM | 2:08:53 PM | Speed limit | 20+ MPH over-Speed limit: 25MPH, speed: 46MPH | 5 |
| 2:08:55 PM | 2:08:57 PM | Speed limit | 15-20 MPH over-Speed limit: 25MPH, speed: 45MPH | 4 |
| 2:08:59 PM | 2:08:59 PM | Speed limit | 10-15 MPH over-Speed limit: 25MPH, speed: 39MPH | 3 |
| 2:09:01 PM | 2:09:01 PM | Speed limit | 5 - 10 MPH over-Speed limit: 25MPH, speed: 34MPH | 2 |
| 2:09:03 PM | 2:09:09 PM | Speed limit | 1-5 MPH over-Speed limit: 25MPH, speed: 29MPH | 1 |
| 2:09:11 PM | 2:09:11 PM | Speed limit | 5-10 MPH over-Speed limit: 25MPH, speed: 32MPH | 2 |
| 2:09:13 PM | 2:09:13 PM | Speed limit | 10-15 MPH over-Speed limit: 25MPH, speed: 37MPH | 3 |
| 2:09:15 PM | 2:09:19 PM | Speed limit | 15-20 MPH over-Speed limit: 25MPH, speed: 41MPH | 4 |
| 2:09:21 PM | 2:09:21 PM | Speed limit | 20+ MPH over-Speed limit: 25MPH, speed: 47MPH | 5 |
| 2:09:33 PM | 2:09:33 PM | Speed limit | 15-20 MPH over-Speed limit: 25MPH, speed: 45MPH | 4 |
| 2:09:35 PM | 2:09:35 PM | Speed limit | 10-15 MPH over-Speed limit: 25MPH, speed: 39MPH | 3 |
| 2:09:37 PM | 2:09:37 PM | Speed limit | | |

FIG. 19B

| | | | |
|---|---|---|---|
| 2:09:39 PM | 2:09:39 PM | Speed limit | 1-5 MPH over-Speed limit: 25MPH, speed: 29MPH | 1 |
| 2:09:53 PM | 2:09:53 PM | Speed limit | 5-10 MPH over-Speed limit: 20MPH, speed: 30MPH | 2 |
| 2:09:55 PM | 2:09:55 PM | Speed limit | 10-15 MPH over-Speed limit: 20MPH, speed: 34MPH | 3 |
| 2:09:57 PM | 2:09:57 PM | Speed limit | 15-20 MPH over-Speed limit: 20MPH, speed: 38MPH | 4 |
| 2:09:59 PM | 2:10:11 PM | Speed limit | 20+ MPH over-Speed limit: 20MPH, speed: 42MPH | 5 |
| 2:10:13 PM | 2:10:13 PM | Speed limit | 15-20 MPH over-Speed limit: 20MPH, speed: 40MPH | 4 |
| 2:10:15 PM | 2:10:15 PM | Speed limit | 10-15 MPH over-Speed limit: 20MPH, speed: 32MPH | 3 |
| 2:10:17 PM | 2:10:17 PM | Speed limit | 1-5 MPH over-Speed limit: 20MPH, speed: 23MPH | 1 |
| 2:10:25 PM | 2:10:25 PM | Speed limit | 1-5 MPH over-Speed limit: 20MPH, speed: 22MPH | 1 |
| 2:10:27 PM | 2:10:27 PM | Speed limit | 5-10 MPH over-Speed limit: 20MPH, speed: 27MPH | 2 |
| 2:10:29 PM | 2:10:31 PM | Speed limit | 10-15 MPH over-Speed limit: 20MPH, speed: 31MPH | 3 |
| 2:10:33 PM | 2:10:35 PM | Speed limit | 15-20 MPH over-Speed limit: 20MPH, speed: 37MPH | 4 |
| 2:10:37 PM | 2:10:37 PM | Speed limit | 20+ MPH over-Speed limit: 20MPH, speed: 42MPH | 5 |
| 2:10:51 PM | 2:10:51 PM | Speed limit | 10-15 MPH over-Speed limit: 20MPH, speed: 34MPH | 3 |
| 2:10:53 PM | 2:10:53 PM | Speed limit | 1-5 MPH over-Speed limit: 20MPH, speed: 24MPH | 1 |
| 2:11:05 PM | 2:11:05 PM | Speed limit | 1-5 MPH over-Speed limit: 20MPH, speed: 22MPH | 1 |
| 2:11:07 PM | 2:11:07 PM | Speed limit | 5-10 MPH over-Speed limit: 20MPH, speed: 27MPH | 2 |
| 2:11:09 PM | 2:11:09 PM | Speed limit | 10-15 MPH over-Speed limit: 20MPH, speed: 31MPH | 3 |
| 2:11:13 PM | 2:11:13 PM | Speed limit | 15-20 MPH over-Speed limit: 20MPH, speed: 37MPH | 4 |
| 2:11:15 PM | 2:11:15 PM | Speed limit | 20+ MPH over-Speed limit: 20MPH, speed: 41MPH | 5 |
| 2:11:47 PM | 2:11:47 PM | Speed limit | 15-20 MPH over-Speed limit: 20MPH, speed: 39MPH | 4 |
| 2:11:49 PM | 2:11:49 PM | Speed limit | 10-15 MPH over-Speed limit: 20MPH, speed: 32MPH | 3 |
| 2:11:51 PM | 2:11:51 PM | Speed limit | 1-5 MPH over-Speed limit: 20MPH, speed: 23MPH | 1 |
| 2:12:09 PM | 2:12:09 PM | Speed limit | 1-5 MPH over-Speed limit: 20MPH, speed: 22MPH | 1 |
| 2:12:11 PM | 2:12:11 PM | Speed limit | 5-10 MPH over-Speed limit: 20MPH, speed: 27MPH | 2 |
| 2:12:13 PM | 2:12:13 PM | Speed limit | 10-15 MPH over-Speed limit: 20MPH, speed: 31MPH | 3 |
| 2:12:15 PM | 2:12:17 PM | Speed limit | 15-20 MPH over-Speed limit: 20MPH, speed: 36MPH | 4 |

FIG. 19C

| | | | | |
|---|---|---|---|---|
| 2:12:19 PM | 2:12:19 PM | Speed limit | 20+ MPH over-Speed limit: 20MPH, speed: 41MPH | 5 |
| 2:12:21 PM | 2:12:21 PM | Speed limit | 15-20 MPH over-Speed limit: 20MPH, speed: 37MPH | 4 |
| 2:12:23 PM | 2:12:23 PM | Speed limit | 5-10 MPH over-Speed limit: 20MPH, speed: 28MPH | 2 |
| 2:12:25 PM | 2:12:25 PM | Speed limit | 1-5 MPH over-Speed limit: 20MPH, speed: 21MPH | 1 |
| 2:12:27 PM | 2:12:27 PM | Speed limit | 5-10 MPH over-Speed limit: 15MPH, speed: 25MPH | 2 |
| 2:12:29 PM | 2:12:29 PM | Speed limit | 15-20 MPH over-Speed limit: 15MPH, speed: 32MPH | 4 |
| 2:12:31 PM | 2:12:59 PM | Speed limit | 20+ MPH over-Speed limit: 15MPH, speed: 36MPH | 5 |
| 2:13:01 PM | 2:13:03 PM | Speed limit | 15-20 MPH over-Speed limit: 20MPH, speed: 37MPH | 4 |
| 2:13:05 PM | 2:13:07 PM | Speed limit | 10-15 MPH over-Speed limit: 20MPH, speed: 35MPH | 3 |
| 2:13:09 PM | 2:13:13 PM | Speed limit | 1-5 MPH over-Speed limit: 15MPH, speed: 19MPH | 1 |
| 2:13:15 PM | 2:13:21 PM | Speed limit | 5-10 MPH over-Speed limit: 15MPH, speed: 22MPH | 2 |

FIG. 19D

Trip 1

DSR: 68.28   DSR without persistent events: 68.28

Traffic Violations

| Start Time | End Time | Type | Description | Severity |
|---|---|---|---|---|
| 1/26/2004 12:33:38 PM | 1/26/2004 12:33:38 PM | Speed limit | 1-5 MPH over - Speed limit 20MPH, speed 23MPH | 1 |
| 1/26/2004 12:33:40 PM | 1/26/2004 12:33:42 PM | Speed limit | 5 - 10 MPH over - Speed limit 20MPH, speed 27MPH | 2 |
| 1/26/2004 12:33:44 PM | 1/26/2004 12:33:44 PM | Speed limit | 10 - 15 MPH over - Speed limit 20MPH, speed 35MPH | 3 |
| 1/26/2004 12:33:46 PM | 1/26/2004 12:34:14 PM | Speed limit | 15 - 20 MPH over - Speed limit 20MPH, speed 37MPH | 4 |
| 1/26/2004 12:34:16 PM | 1/26/2004 12:34:20 PM | Speed limit | 20+ MPH over - Speed limit 20MPH, speed 42MPH | 5 |
| 1/26/2004 12:34:22 PM | 1/26/2004 12:34:24 PM | Speed limit | 15 - 20 MPH over - Speed limit 20MPH, speed 40MPH | 4 |
| 1/26/2004 12:34:26 PM | 1/26/2004 12:34:26 PM | Speed limit | 10 - 15 MPH over - Speed limit 20MPH, speed 31MPH | 3 |
| 1/26/2004 12:34:28 PM | 1/26/2004 12:34:28 PM | Speed limit | 1-5 MPH over - Speed limit 20MPH, speed 24MPH | 1 |
| 1/26/2004 12:34:40 PM | 1/26/2004 12:34:40 PM | Speed limit | 5 - 10 MPH over - Speed limit 20MPH, speed 25MPH | 2 |
| 1/26/2004 12:34:42 PM | 1/26/2004 12:34:44 PM | Speed limit | 10 - 15 MPH over - Speed limit 20MPH, speed 31MPH | 3 |
| 1/26/2004 12:34:46 PM | 1/26/2004 12:34:48 PM | Speed limit | 15 - 20 MPH over - Speed limit 20MPH, speed 36MPH | 4 |
| 1/26/2004 12:34:50 PM | 1/26/2004 12:35:02 PM | Speed limit | 20+ MPH over - Speed limit 20MPH, speed 41MPH | 5 |
| 1/26/2004 12:35:04 PM | 1/26/2004 12:35:04 PM | Speed limit | 15 - 20 MPH over - Speed limit 20MPH, speed 39MPH | 4 |
| 1/26/2004 12:35:06 PM | 1/26/2004 12:35:06 PM | Speed limit | 10 - 15 MPH over - Speed limit 20MPH, speed 33MPH | 3 |
| 1/26/2004 12:35:08 PM | 1/26/2004 12:35:09 PM | Speed limit | 5 - 10 MPH over - Speed limit 20MPH, speed 26MPH | 2 |
| 1/26/2004 12:35:34 PM | 1/26/2004 12:35:34 PM | Speed limit | 5 - 10 MPH over - Speed limit 20MPH, speed 27MPH | 2 |
| 1/26/2004 12:35:36 PM | 1/26/2004 12:35:36 PM | Speed limit | 10 - 15 MPH over - Speed limit 20MPH, speed 32MPH | 3 |
| 1/26/2004 12:35:42 PM | 1/26/2004 12:35:42 PM | Speed limit | 15 - 20 MPH over - Speed limit 20MPH, speed 35MPH | 4 |
| 1/26/2004 12:35:44 PM | 1/26/2004 12:35:54 PM | Speed limit | 20+ MPH over - Speed limit 20MPH, speed 42MPH | 5 |
| 1/26/2004 12:35:56 PM | 1/26/2004 12:35:56 PM | Speed limit | 15 - 20 MPH over - Speed limit 20MPH, speed | 4 |

FIG. 25

Trip 1

Trip streets

| Start Time | End Time | Street name | Speed limit (MPH) |
|---|---|---|---|
| 1/26/2004 12:33:06 PM | 1/26/2004 12:36:32 PM | ALDEN BRIDGE DR | 30 |
| 1/26/2004 12:36:32 PM | 1/26/2004 12:36:22 PM | RESEARCH FOREST DR | 30 |
| 1/26/2004 12:36:22 PM | 1/26/2004 12:40:22 PM | RESEARCH FOREST DR | 35 |
| 1/26/2004 12:40:22 PM | 1/26/2004 12:40:24 PM | RESEARCH FOREST DR | 5 |
| 1/26/2004 12:40:24 PM | 1/26/2004 12:43:24 PM | RESEARCH FOREST DR | 35 |
| 1/26/2004 12:43:24 PM | 1/26/2004 12:45:38 PM | INTERSTATE 45 N | 35 |
| 1/26/2004 12:45:38 PM | 1/26/2004 12:45:40 PM | WOODLANDS PKWY | 35 |
| 1/26/2004 12:45:40 PM | 1/26/2004 12:46:14 PM | I45 | 15 |
| 1/26/2004 12:45:44 PM | 1/26/2004 12:47:06 PM | NURSERY RD | 30 |
| 1/26/2004 12:47:24 PM | 1/26/2004 12:48:10 PM | OAK RIDGE DR | 30 |

FIG. 27

MOTOR VEHICLE OPERATING DATA COLLECTION AND ANALYSIS

CROSS REFERENCE TO RELATED APPLICATION

The present application is a continuation of U.S. application Ser. No. 14/310,818 filed on Jun. 20, 2014 and entitled "Motor Vehicle Operating Data Collection and Analysis" a continuation of U.S. application Ser. No. 11/921,192 filed on Nov. 9, 2012 and entitled "Motor Vehicle Operating Data Collection and Analysis," which claims priority to PCT/US2005/019279 filed Jun. 1, 2005 and entitled "Motor Vehicle Operating Data Collection Analysis." All of the aforementioned applications are incorporated by reference in their entirety herein.

FIELD OF USE

The invention pertains to a method and apparatus for evaluating recorded data of a driver's operation of a motor vehicle. The invention is not limited to trucks and automobiles but includes all powered equipment such as boats, airplanes and railroads. The invention utilizes time marked data that can be correlated with information from separate databases, particularly data that is also time marked. The recorded data may facilitate the vehicle owner monitoring the use of the vehicle by others, e.g., employees, automobile renters or family members, e.g., teenage drivers. The recorded data may also provide an objective behavioral data collection system for third parties, e.g., life and health insurance companies, lending institutions, credit rating companies, product and service marketing companies, potential employers, to evaluate an individual's behavioral characteristics in a real life and commonly experienced situation, i.e., driving a motor vehicle.

PRIOR ART

Several commercial mechanisms are available on the market that provide means to monitor vehicle use. One example is the Alltrackusa product that relies on a global positioning satellite (GPS) system to track vehicle operation. Such systems employ a calculating methodology to determine speed and acceleration by using the position differential implied by the GPS. Conversely, Davis Technologies markets the Car-Chip product which is a passive OBD data recorder for hobbyists and car enthusiasts who want to record their engine performance. The shortcomings of the Alltrackusa 'GPS only' application is that actual speed information is not available during intermittent losses of the GPS signal, which are frequent. This limits the product's usefulness for creating a complete dataset suitable for developing a useful and objective driver safety ratings. The shortcoming of the CarChip product is that the unit does not provide GPS capability and the target market is for car enthusiasts who want to monitor engine diagnostics. Both existing technology developments have the inherent shortcoming of local data storage and reporting. This feature limits the usefulness of the data and does not allow for the development of an independent rating system.

U.S. Pat. No. 6,064,970, assigned to Progressive Casualty Insurance Company, discloses a method and system for determining the cost of automobile insurance based upon monitoring, recording and communicating data representative of operator and vehicle driving characteristics. The system includes use of a wireless up-link to a central control station to communicate 'triggering events'.

U.S. Pat. No. 6,064,970 defines a methodology for private insurance quotes based on endogenous driver variables that are acquired from the customer or collected by the insurance company. U.S. Pat. No. 6,064,970 does not teach an apparatus and business process that allows customers to voluntarily create datasets that are then objectively interpreted by a third party and converted to objective safety ratings, much as credit payments or delinquencies are converted to an objective credit rating, or company debt histories converted to a bond rating. This distinction is vital in order to promote the adoption of driver monitoring technology and guarantee that it is utilized in a manner that promotes the most societal good, rather than simply being the exclusive purview of one company's insurance premium pricing structure.

Other devices and methods are disclosed in published patent applications. Included is the application Ser. No. 10/764,076 assigned to Progressive Casualty Insurance Company filed Jan. 23, 2004. Another device is disclosed in a published application, Ser. No. 10/281,330 assigned to Davis Instruments, and filed Oct. 25, 2003.

The existing systems and devices also ignore the profound behavioral characteristics exhibited by drivers in operating motor vehicles, e.g., aggressiveness or patience, caution or recklessness, compliance with laws, etc. These characteristics are relevant to each individual's behavior in other situations including performance of job duties, behavior in stress, and meeting obligations owed to others. These behaviors cannot be ascertained unless the information is uploaded to a central server to create a comprehensive database for comparison and development of useful profiles. Existing technology applications do not centrally store the data and interpret it in context to provide a useful service to society.

SUMMARY

The present invention teaches the evaluation and storing of recorded date and time stamped operating data ("time marked data") from a motor vehicle component. It also teaches the subsequent upload to a microprocessor, CPU or central web-server for objective analysis. It may also include real time input to the driver or vehicle owner. The data may also be location marked and the vehicle data may be correlated with separate time or location specific data points or databases. The recording of the data to a separate device can be used in such a manner as to insure a complete data set, minimize fraudulent use, and thus insure the accuracy and usefulness of said data to third parties. Utilization of the data may be subject to terms of agreements among the vehicle operator, the vehicle owner, insurance companies and underwriters (health, life or auto, etc.), research professionals, credit reporting agencies, marketing and advertising firms, legal representatives, governmental authorities or other institutions.

Since the data may be time marked with an accurate atomic clock signal, the data can be cross-correlated to another information database that is also time or location specific. This data could include weather events, construction schedules, sporting events, traffic databases, and other time or location dependent information that puts the driver operating data in context and makes it objectively useful. The data manipulation-analysis includes assessing the driver's driving behavior by putting the data in context with the applicable local speed laws, signage, traffic signals, weather, and other geographic dependencies ("GIS" data).

The invention can utilize a variety of currently monitored and publicly accessible vehicle information from vehicle systems such as an OBD (on-board diagnostic) or CAN (car area network) data-port. This time marked data may include vehicle speed, throttle position, oxygen sensor data, etc. This information is sequentially recorded at regular intervals from vehicle onboard diagnostic systems, thereby creating a time marked data set of individual data points. The data set of time marked sequential data points may include the vehicle's location, for example as determined by a global positioning system (GPS).

Having multiple sources of vehicle data will insure data accuracy. For example, speed can either be inferred from the GPS position and time stamped data by calculating the distance between recorded locations and dividing by the time increment, or by accessing speed values directly from the OBD or similar port. Similarly, the vehicle's odometer reading can be gathered three different ways: first, it can be accessed through the OBD extended dataset if the car manufacturer grants permission, secondly, it can be calculated from the GPS location and time stamped data, third it can be calculated from the speed data logged directly from the OBD port, then multiplied by the time increment to get distance. Having multiple sources of data insures data integrity by crosschecking. Time and location stamping the data allows for crosschecking against other information databases such as weather, traffic, etc.

This collected data may be transferred to a processor (CPU or microprocessor) and may be uploaded to a central webserver for evaluation and storage. The invention utilizes data obtained from individual vehicle monitoring and instrumentation devices already built into motor vehicles since 1996. The invention can also utilize information from supplemental instrumentation such as GPS devices installed on motor vehicles.

The invention teaches transfer of the time marked information from the collection system within the vehicle to a CPU or similar processor. This component may be within the vehicle or separately located. The invention teaches flexible, multi stage evaluation of the collected data for variable factors or criteria. The invention permits a weighted profile to be created that can be correlated to both frequency and severity or significance of behavior. This weighted profile is useful because the data integrity has been insured by multiple sources.

The invention also teaches a business subscription service that can be used in conjunction with the recording/analysis apparatus. The method allows analytic comparison within groups using collected data from separate units. This analysis can allow assessment and comparison of a variety of life style/health factors. The analysis, based upon historical and accurate data, can be used in conjunction with other demographically relevant information.

The invention also teaches wireless or telemetry communication between the in vehicle components, e.g., data storage or processor, and a separate processor or other electronic data receiving device, thereby eliminating the need to remove a memory component from the vehicle to a data recording or transfer component.

The invention also teaches the monitoring and recording of data from onboard cameras and proximity sensors, as well as driver physiological monitoring systems. Also included within the invention is predictive modeling of future behavior as a function of recorded data an individual driver compared with other drivers within a database.

BRIEF SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIGS. 19A through 19D comprise a table of actual recorded time marked speed data and assessed violation/penalty utilizing an embodiment of the invention.

FIG. 25 illustrates the screen display of evaluated trip data derived from the matrix of time and location marked data.

FIG. 27 is a representation of the display screen of the invention showing the streets traveled during a selected driving event (trip) as well as the time and speed limit.

Figure 1:
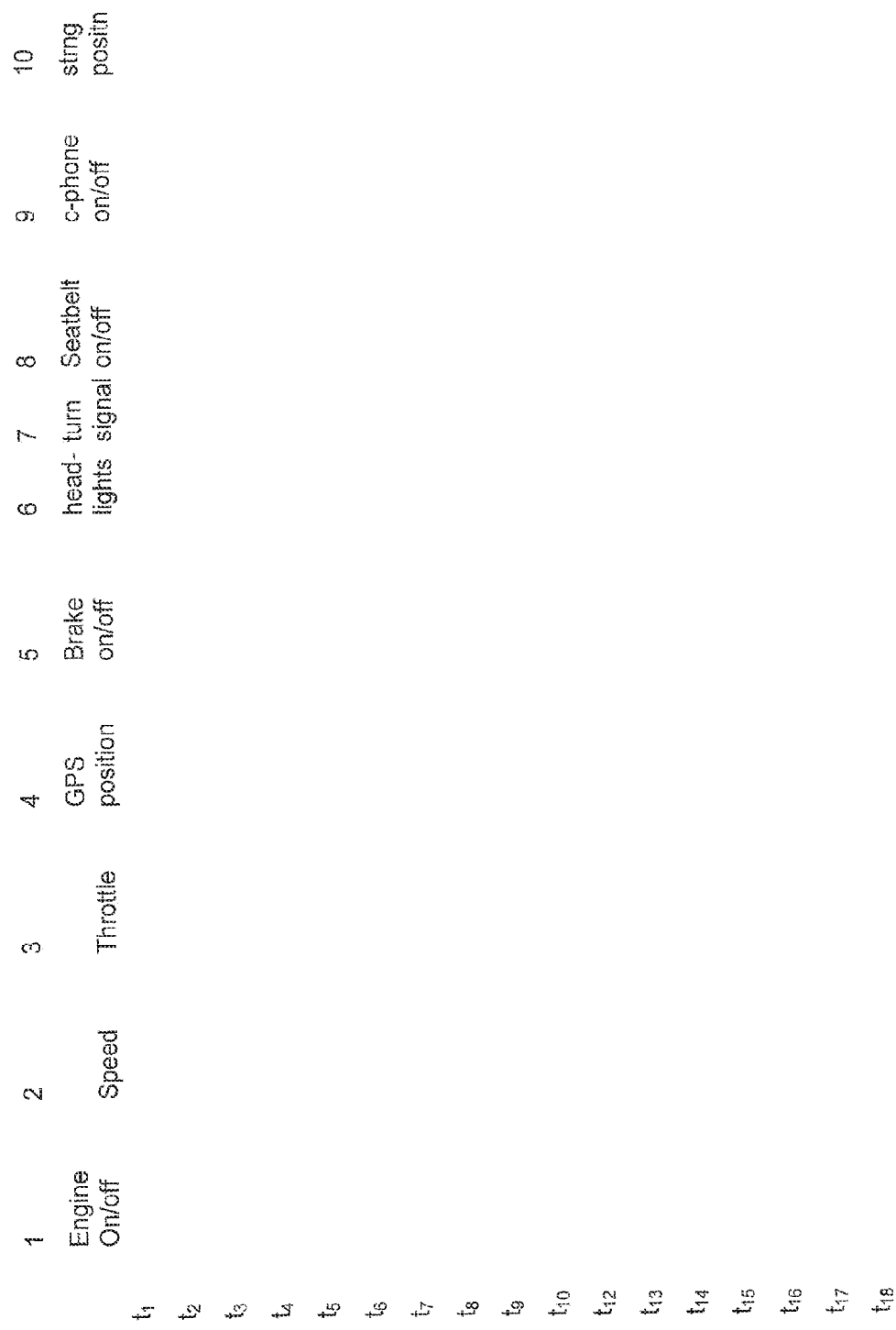
FIG. 1 illustrates a matrix of time marked vehicle data that can be evaluated by the invention.

It will be appreciated that the foregoing drawings illustrate only one embodiment of the invention and that numerous other variations may be created within the scope of the described invention.

DETAILED DESCRIPTION OF INVENTION

The above general description and the following detailed description are merely illustrative of the subject invention and additional modes, advantages and particulars of this invention will be readily suggested to those skilled in the art without departing from the spirit and scope of the invention.

The invention comprises multiple steps, beginning with the collection of data at regular time intervals, preferably at least as frequently as approximately every two seconds. The data includes the publicly available operational data from an industry standard port such as a SAE-1962 connector, or an on board diagnostic ("OBD") port or other vehicle data acquiring component. For example, operation data accessible via the OBDI I port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle can be collected since the extended OBDII set includes a whole host of engine or other power source diagnostic variables.

The invention includes the capability to recognize the particular language emitted by the vehicle system and may configure the recording component to receive or convert data in SAE J1850, ISO ISO9141 or KWP 2000 formats. Alternatively, this step may be performed by a processor after the data is recorded.

Further the invention applies to other data systems being developed and implemented. An example is the CAN (car area network). Additionally, data from devices or systems that, for example, provide a lane departure warning, may be recorded. Such systems incorporate one or more cameras integrated with other sensors to analyze vehicle speed and other factors to monitor the distance between the vehicle and roadway lane divider lines. Data also can be recorded from systems that combine laser sensors and digital rangefinders to scan the road and detect vehicles or other objects ahead. Such systems ("active cruise control") can provide warning or directly reduce speed or activate braking systems. Sensors or rangefinders may similarly detect the presence and distance of objects behind the vehicle.

The position and movement of the vehicle can also be collected utilizing a global position system or "GPS" system. Other known locating technologies such as radio frequency tags, cellular telephone networks, or differential GPS may be used. Such technologies are hereinafter referred to as "GPS" technology or locators.

One embodiment of the invention utilizes data points of various systems and operations collected at substantially simultaneous intervals, thereby creating sequential "data points" containing information from multiple sources pertaining to vehicle operation and movement. The data points are recorded at regular intervals. These intervals can be of varied duration. For purpose of illustration of the invention herein, the intervals are specified to be every two seconds.

The data can be recorded or transferred to various removable electronic storage devices, including but not limited to flash memory cards now utilized for digital cameras, etc. Alternatively, recorded data may be transferred remotely via wireless technology currently known as Bluetooth®. (The Bluetooth word mark and logos are owned by the Bluetooth SIG, Inc.) Other wireless communication systems such as cellular telephone, radio or satellite may be used. These technologies are hereinafter termed "wireless" transfer or technology.

The data can be transferred to another electronic data reading device such as a microprocessor, a CPU or CPU linked to an Internet server. The recorded data may also be evaluated by a CPU within the vehicle. The data can be transferred, stored, manipulated and analyzed ("evaluated") as desired to provide information concerning not only the location and duration of vehicle operation, but also the manner in which the vehicle was operated. For situations where multiple drivers utilize multiple vehicles, each vehicle can be equipped with a non-removable memory to record all its operation, regardless of which driver utilizes the vehicle. This data can then be reconciled with the data downloaded by the driver through his or her personal flash memory card. Gaps in the data can then be investigated by an employer, parent, owner of a rental vehicle, or otherwise responsible party, i.e., the "user".

The invention also teaches the recording and evaluation of driver physiological data, such as heart rate, electrocardiograph (ECG) signals and blood pressure. For example, ECG signals may be recorded from Polar® sensors located on the steering wheel. (Polar is a registered trademark of Polar Electro Oy Corporation.)

As suggested in the foregoing summary of invention, that summary being incorporated by reference within this detailed description of invention, utilization of the data recorded by the invention or the resulting evaluation thereof, may be subject to terms of agreements among the vehicle operator, the vehicle owner, insurance companies and underwriters (health, life or auto, etc.), research professionals, credit reporting agencies, marketing and advertising firms, legal representatives, governmental authorities or other institutions. For example, time and location data may be useful in monitoring the compliance of a probationer with the terms of probation. It may also recorded compliance with a breathalyzer ignition control switch. Equipment rental companies can use the data for ensuring the lessee has complied with the terms of the rental or lease agreement. For example, operators that can provide documented compliance may be charged lower use rates.

Figure 2:
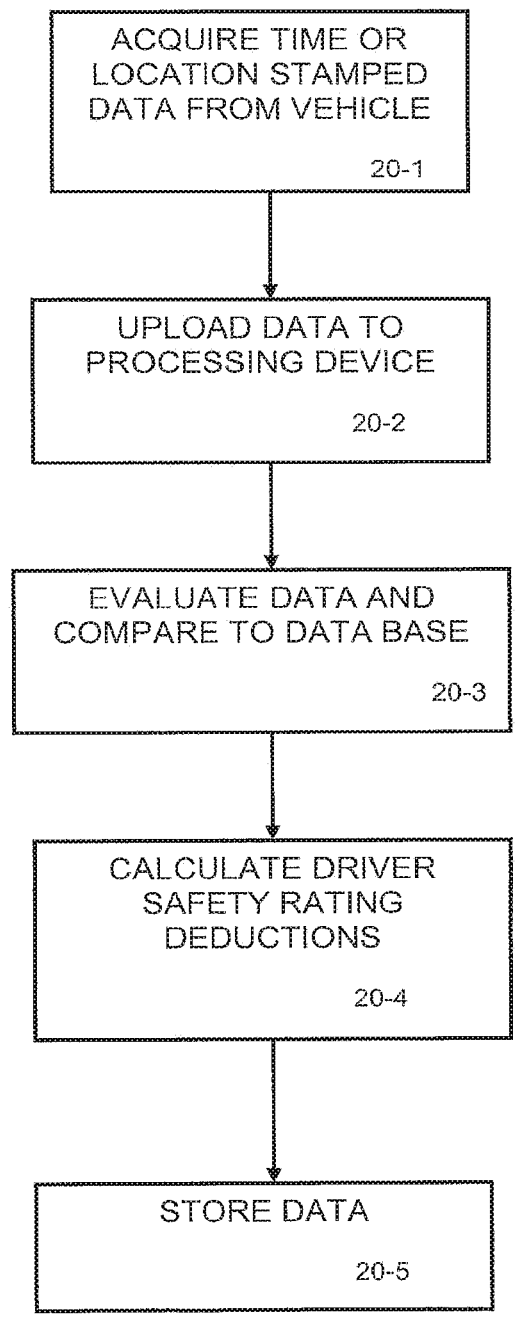
FIG. 2 illustrates an overview or summary of logic steps of one embodiment of the invention.

FIG. 1 illustrates one embodiment of the type and variety of information that may be recorded for evaluation by the invention. The captured information illustrated in FIG. 1 are "Engin on/off" 1, "speed" 2, "throttle" 3, "GPS position" 4, "brake on/off" 5, "headlights" on/off 6, "turn signals" on/off and direction 7, "seatbelt on/off" 8, "c-phone on/off" 9, and "strng positn" (steering wheel position) 10. The invention captures information for each category for each time interval ($t_1$, $t_2$, etc.). The collected data is thereby time marked or time stamped. The data may be evaluated for selected and variable criteria. As illustrated in FIG. 2, time marked data of the variety shown in FIG. 1, can be acquired 20-1 and uploaded 20-2 into the variable evaluative 20-3 algorithm of the invention. The algorithm may be used to objectively rate 20-4 the data for selected factors of driver safety. Note that not all recorded data is required to be evaluated and the stored data 20-5 can be re-evaluated for differing criteria and factors. Therefore, a database may be created for identifiable and separable individuals. The database may track driving and other behavior habits over time.

The operational information may be identifiable to specific operator(s) and include time stamped data and geographic location. Operator identity can be one of many additional data inputs for each time interval recording in FIG. 1. Further, comparison of recorded speeds at differing data points can provide information regarding vehicle acceleration or de-acceleration (rate of acceleration). As indicated, these calculations can be inferred from GPS, or measured directly from the OBD port to insure data integrity. Multiple data sources can be used for comparison or validation of individual recorded data. For example, see FIG. 9 discussed infra. Correlation of vehicle speed with vehicle directional information can also be compared to GPS data of the vehicle travel. The ability to analyze and compare various data sources can provide enhanced data accuracy and validity. The multiple data sources also provide continuity of information when individual data sources may be interrupted, such as temporary interruption of a GPS signal. This continuous monitoring is vital to create objective driver safety ratings that include a complete set of the vehicle's operating data. It also provides an enhanced record of driving events. This record, recorded by the invention, may be valuable in recreating the events prior to a vehicle collision or similar event. It may be a useful in the proof or disproof of fault or liability.

Figure 3:
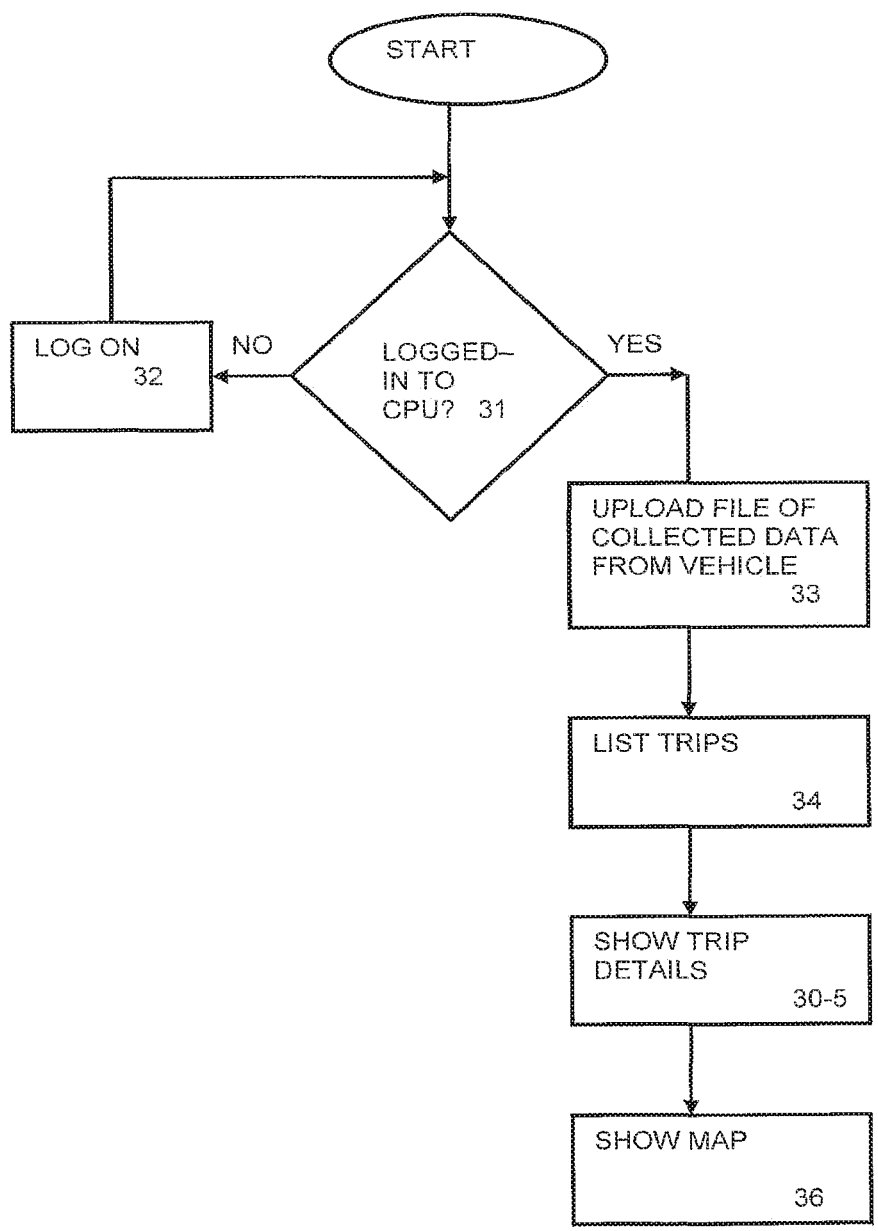
FIG. 3 illustrates starting steps of an embodiment of logic flow steps that can be incorporated into the evaluation method of the present invention.

FIG. 3 illustrates starting steps of an embodiment of logic flow steps that can be incorporated into the evaluation method of the present invention. These steps are implemented after the vehicle operation data has been collected. The system first queries whether the user is logged on or connected to a CPU 31. If not logged on, the user is prompted to log on 32. If logged on, the system uploads files of collected data from the vehicle 33. The system may first process and list the trips recorded in the uploaded collected data 34. The system can display the trip details 30-5, including trip map 36.

Figure 4:
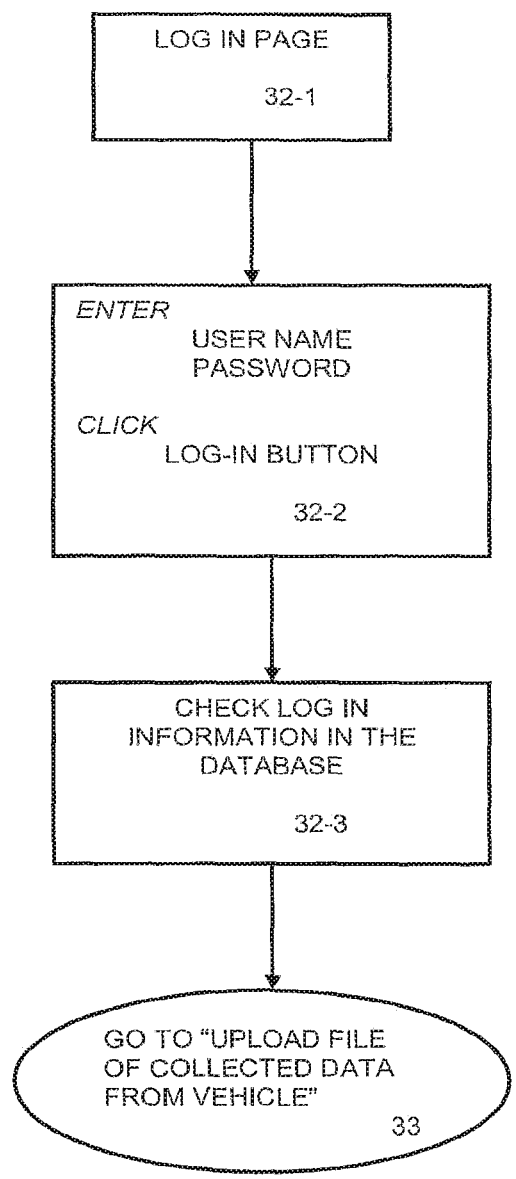
FIG. 4 illustrates an embodiment of logic steps that may be taken by the user for properly logging into the system taught by the invention.
Figure 21:
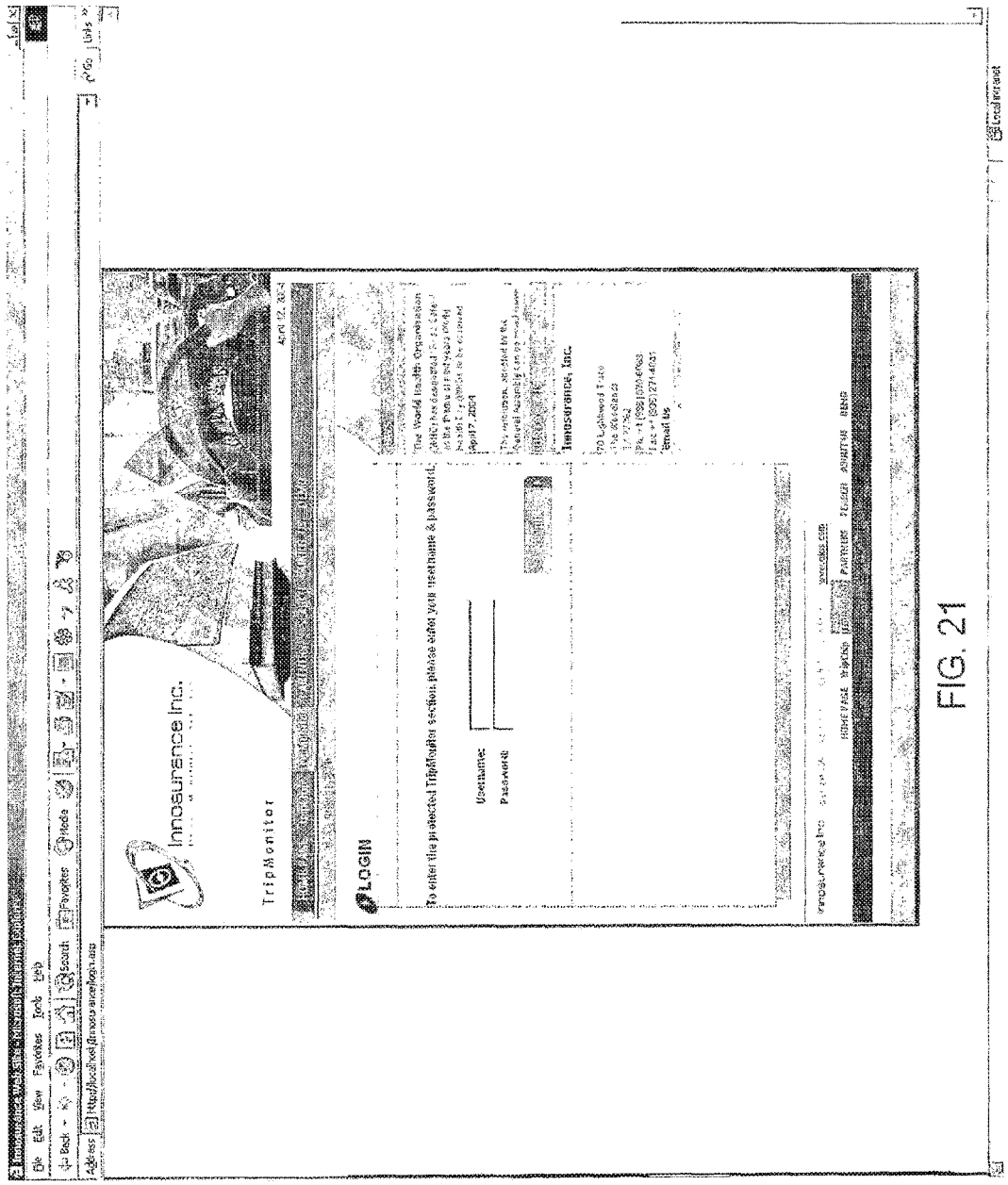
FIG. 21 illustrates the log in page displayed to a user of an embodiment of the invention.

FIG. 4 illustrates an embodiment of logic steps that may be taken by the user for properly logging into the system taught by the invention. Properly logging into the system begins at the log in page 32-1. An example of a log in page is illustrated in FIG. 21. The user can be prompted to enter the user name and password and then to click on the "Log-in button" 32-2. The system then checks the log in information in the database to validate the user. After being validated, the user can be directed to the "Upload File of Collected Data From Vehicle" 33. (See FIGS. 3, 21 and 22.)

Figure 5:
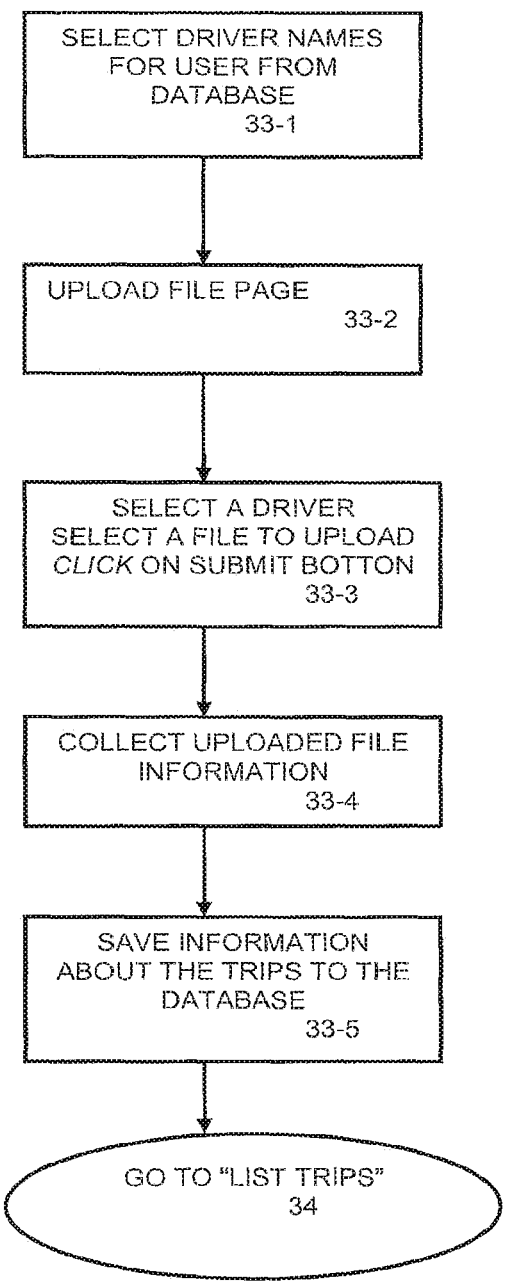
FIG. 5 illustrates logic steps utilized in one embodiment of the invention that are taken in uploading information.
Figure 23:
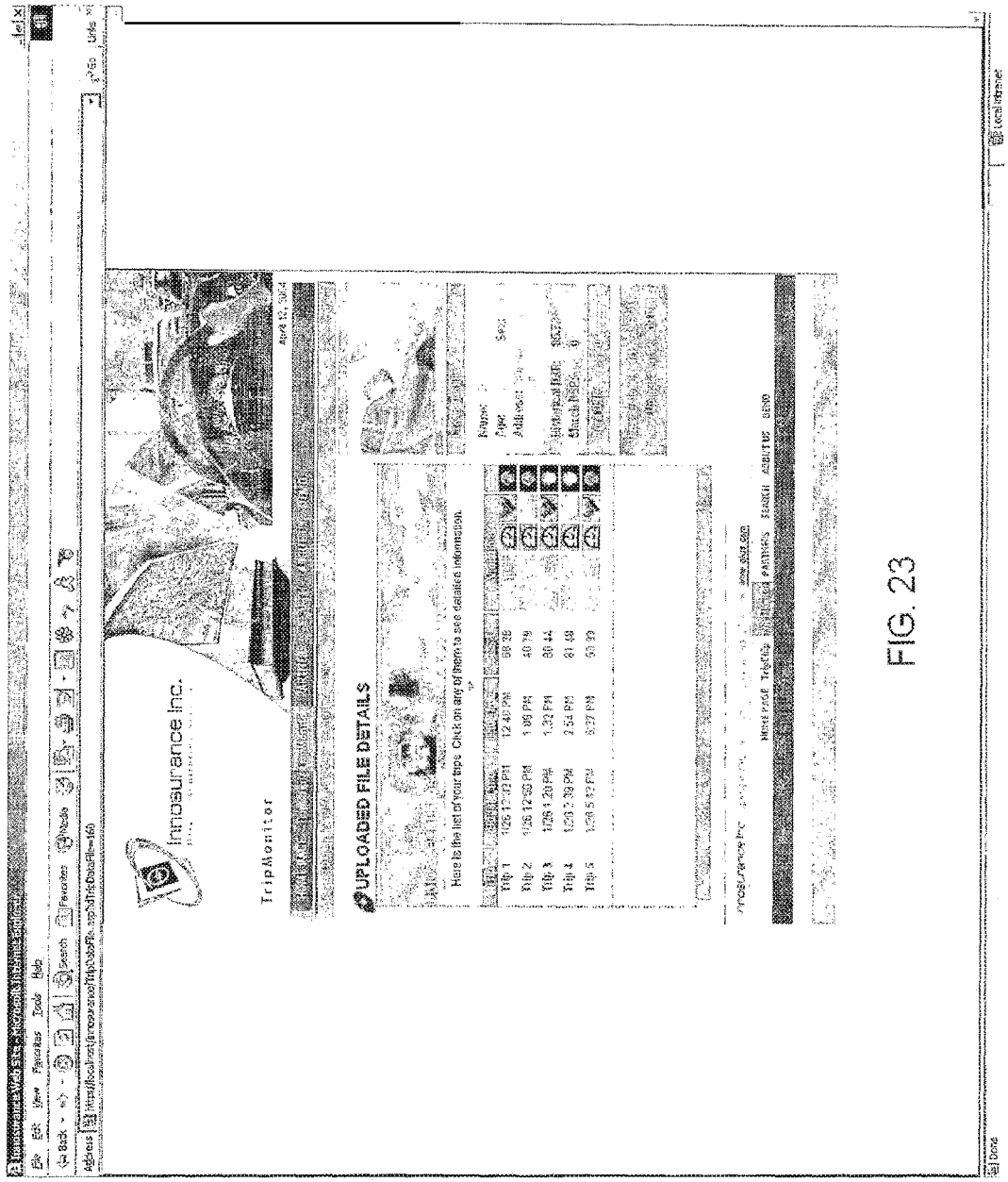
FIG. 23 illustrates the screen display allowing the user to view various driving events of the selected driver that are within the invention database and for which a Driver Safety Rating has been computed.

FIG. 5 illustrates logic steps utilized in one embodiment of the invention that are taken in uploading information. The user can select the driver of interest from the driver names contained in the database. 33-1. The file page for the selected driver(s) is then displayed 33-2 and the user can be prompted to upload the information pertaining to the selected driver into the system. See for example FIG. 23, illustrating a screen display that allows the user to view various driving events of the selected driver that are within the invention database. The information can then be collected and uploaded 33-4. The system can then save the information about the trips to the database 33-5. The user can then be directed to the list trips screen (See FIG. 3)

Figure 6:
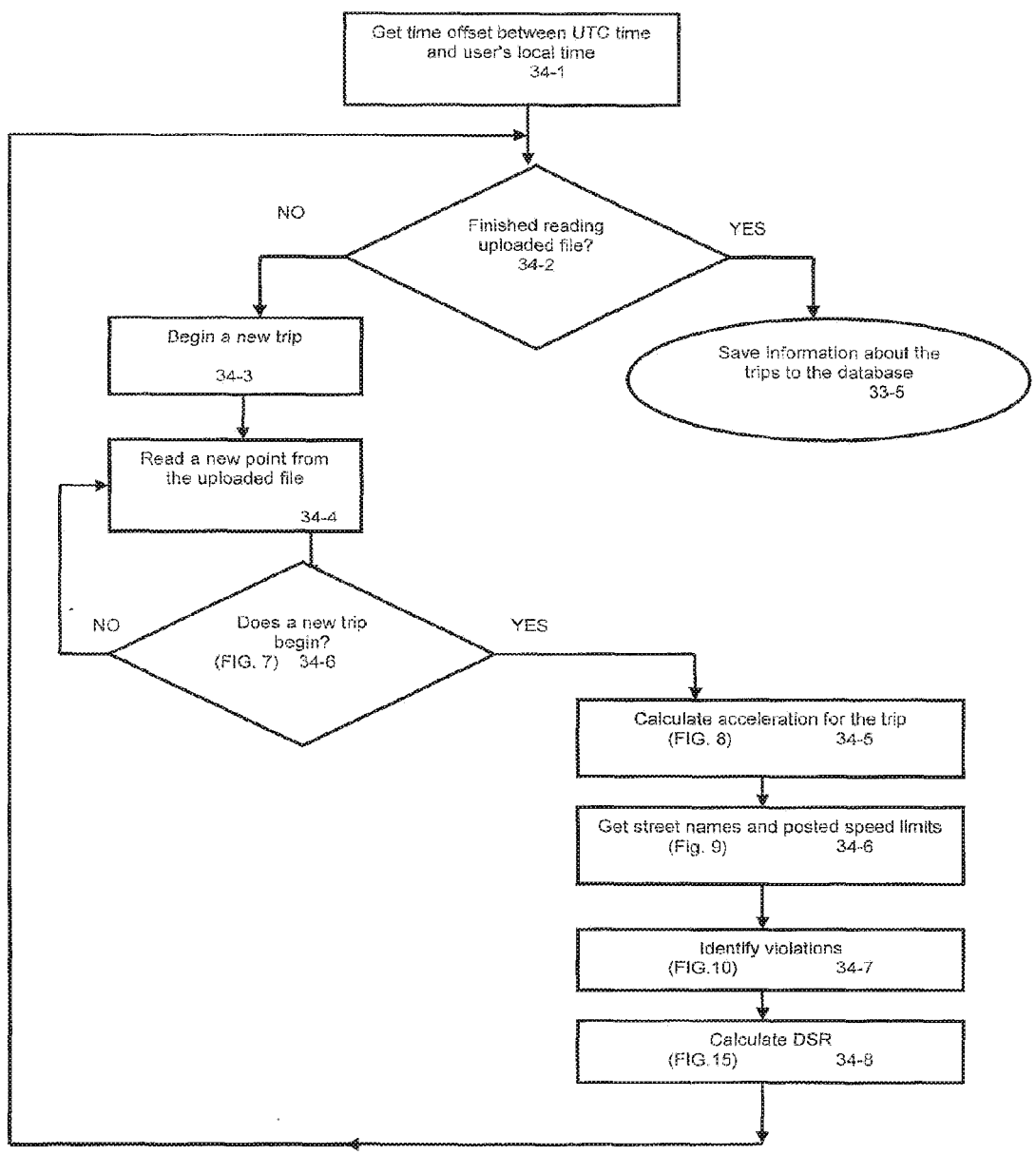
FIG. 6 illustrates the logic steps utilized in one existing embodiment of the invention for reading and commencing revaluation of uploaded files.

FIG. 6 illustrates the logic steps utilized in one existing embodiment of the invention for reading and commencing revaluation of uploaded files. The logic may first provide reconciliation between the local time zone and the UTC time 34-1. The logic sequence then can query whether the system has finished reading the uploaded file 34-2. If the user's session is not completed, the reading of a new trip can begin. The reading commences at a new point on the uploaded file 34-4. The logic sequence queries whether the uploaded file indicates that a new trip has begun 34-6. (See FIG. 7.) If a new trip has not begun, the logic sequence continues reading at a new point on the uploaded file and thereby continuing the review of the trip file. If the uploaded data indicates a new trip has commenced, logic sequence then evaluates the trip. Evaluation can include for example, calculating the acceleration for the trip 34-5, obtaining the street names and posted speed limits 347, identification of violations (e.g., excess speed and acceleration/deceleration) 34-8 and calculation of a DSR rating 34-9. After completing the trip DSR, the system returns to the uploaded file 34-2. If there are no unread files, the information, including calculations, is stored in the database 33-5.

Figure 7:
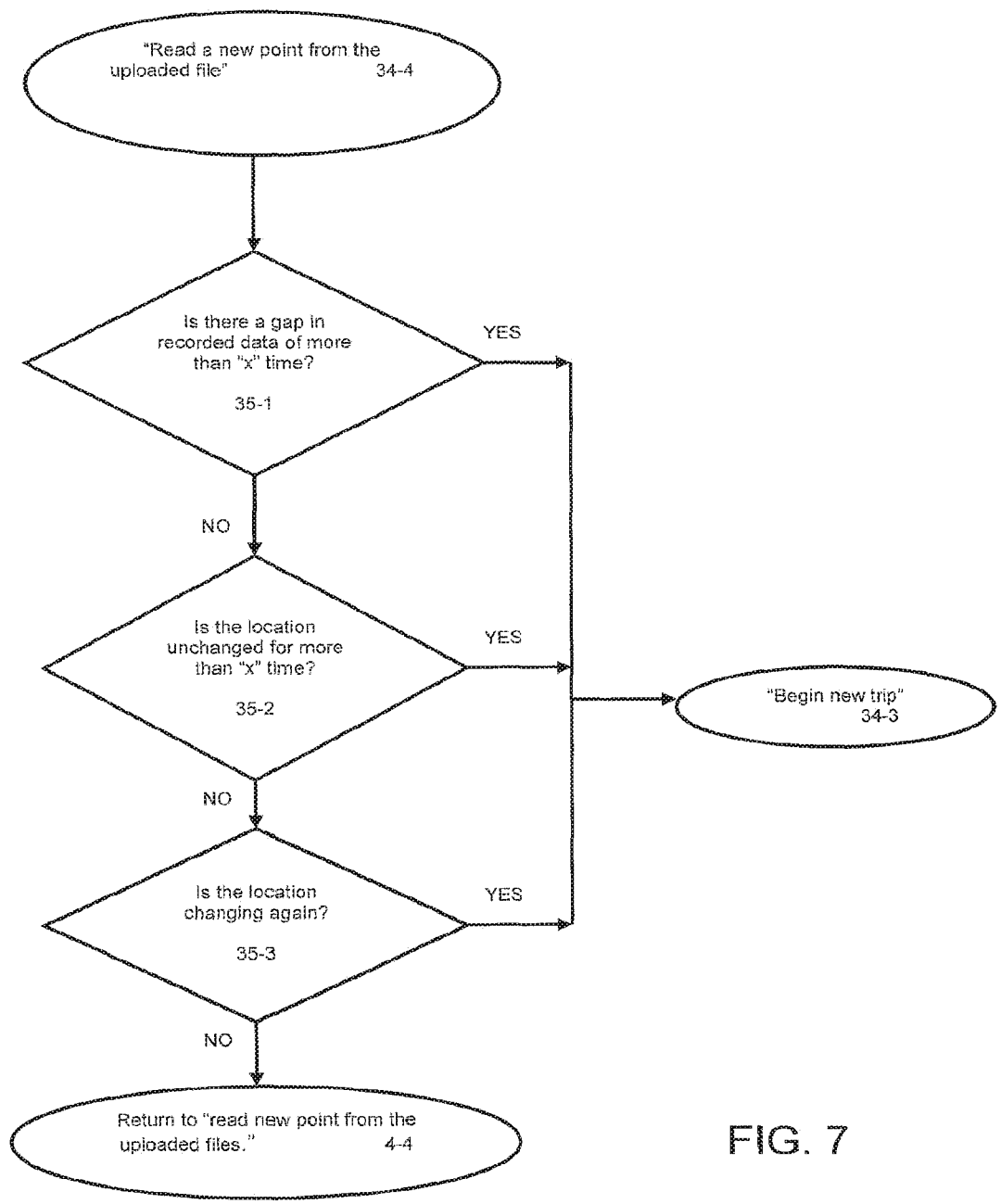
FIG. 7 illustrates logic steps incorporated into one embodiment of the invention wherein uploaded recorded information may signal the end of one driving event and the start of a separate trip.

FIG. 7 illustrates logic steps incorporated into one embodiment of the invention wherein uploaded recorded information may signal the end of one driving event and the start of a separate trip. The sequence illustrates one embodiment of the logic steps determining whether a new trip begins. (See FIG. 6, item 34-6.) The system queries 35-1 whether there is more than a minimum time gap in the recorded data. If yes, the logic program classifies the new information to be part of a separate new trip' 34-3. If there is no gap in recorded data, the system queries whether there has been a change in vehicle location 35-2. If there is no minimum gap of OBDII data but the GPS location data is unchanged for more than the minimum time 35-2, the new GPS data begins a new trip 34-3. (For example, if the car is parked for more than the minimum time, e.g. 15 minutes, with the engine idling, resumed movement of the vehicle after the 16th minute of engine idling, i.e., the vehicle engine continuously operating, would start a new trip.) Until there is more than a minimum time gap in engine (OBD) data or change in vehicle position, a new trip is not deemed to start and the logic continues to read the data as new data of a continuing trip 34-4.

Figure 8:
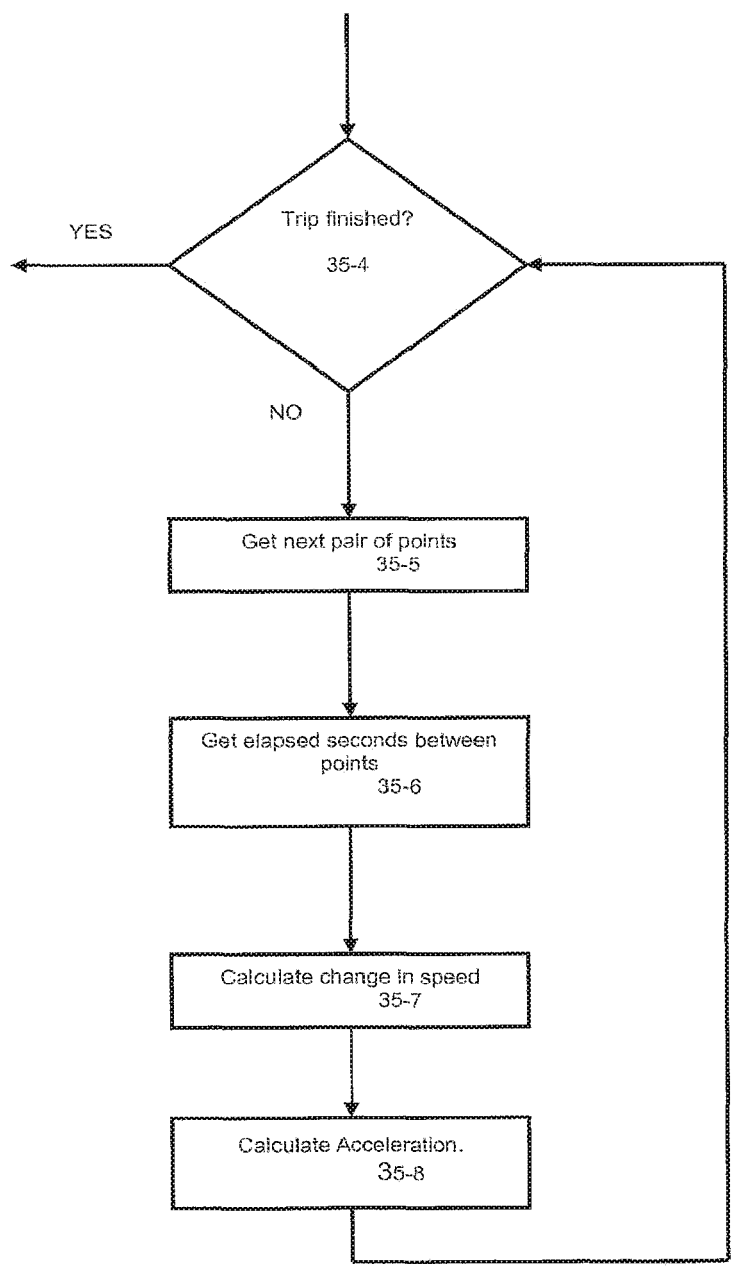
FIG. 8 illustrates logic steps utilized to achieve continued calculation of vehicle acceleration from time marked speed data for a single trip.

FIG. 8 illustrates logic steps utilized to achieve continued calculation of vehicle acceleration from uploaded time marked speed data for a single trip. As the trip continues 35-4, the next speed data point creates a new pair of data points, i.e., the prior data point and the current new speed data point 35-5. The logic program calculates the amount of time 35-6 and the change in speed between the two speed data points 35-7. The change is speed per unit of time is the vehicle acceleration 35-8.

Figure 9:
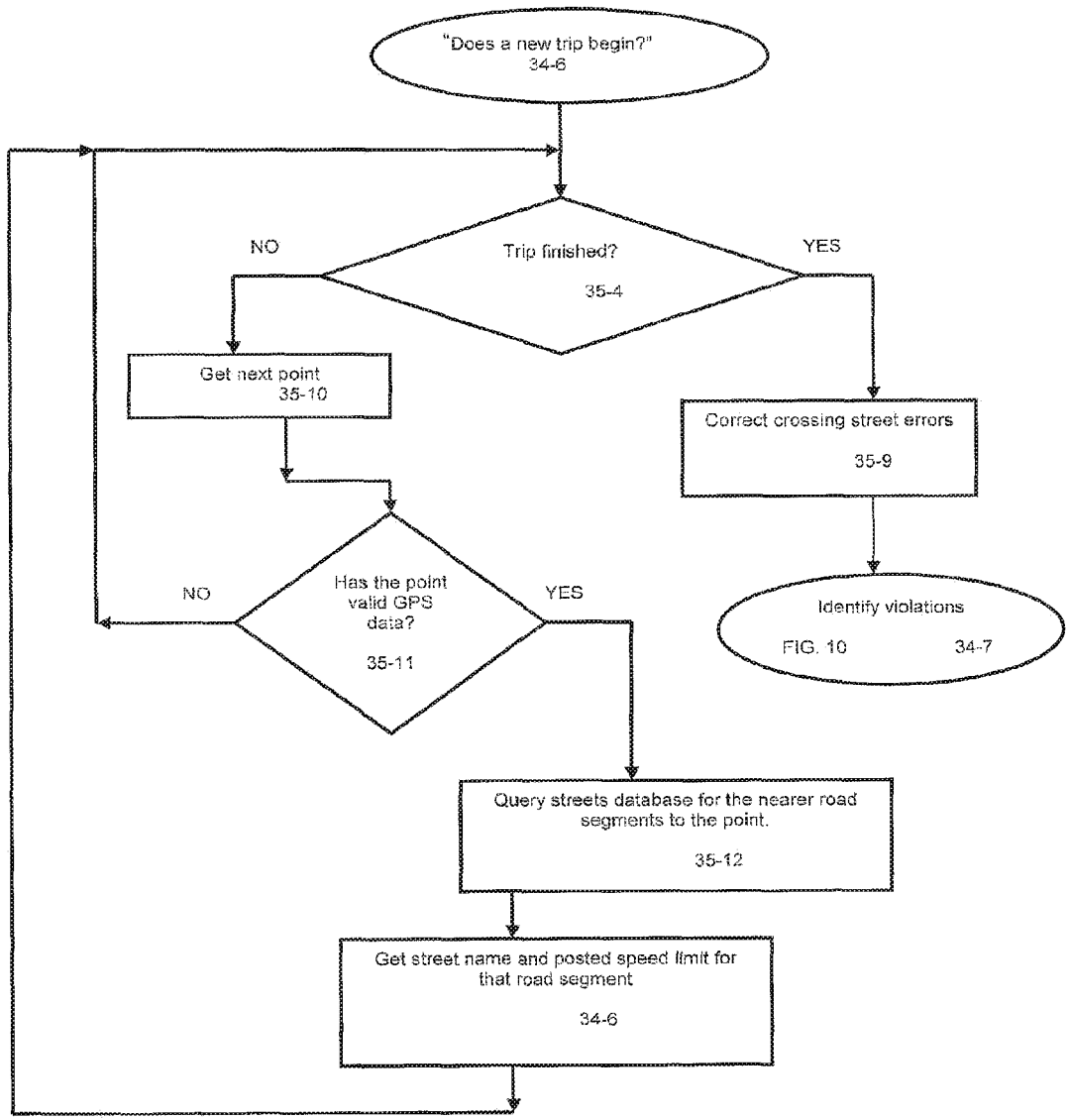
FIG. 9 illustrates the logic steps utilized by an embodiment of the invention to continuously evaluate recorded GPS time marked trip data and correlate data to a separate data base containing street and speed limit information.

FIG. 9 illustrates the logic steps utilized by an embodiment of the invention to continuously evaluate recorded GPS time marked trip data and correlate data to a separate database containing street and speed limit information. The logic program continues from the FIGS. 6 and 7 (see item 34-6 in FIG. 6). If the trip is not finished 35-4, the next data point is evaluated whether it contains valid GPS data 35-11. If yes, the logic system accesses a separate database containing road or street information. After determining the nearer road segment 35-12, the street name and posted speed limit for that identified road segment is obtained from the database 34-6. The logic system again determines whether the trip has been finished 35-4 and if yes, correction is made for crossing street error 35-9. For example if data point t1 is determined to be nearest Jones Street with speed limit 45 mph and data point $t_2$ is determined to be the intersection of Jones and Smith Streets where Smith Street has a speed limit of 35 mph and at data point $t_3$ is determined to be at Jones Street with the continued speed limit of 45 mph, no speed violation will be identified 34-7, assuming, of course, that the driver is operating at 45 mph or below. (Reference is also made to the collection of data points in FIG. 1.)

Figure 10:
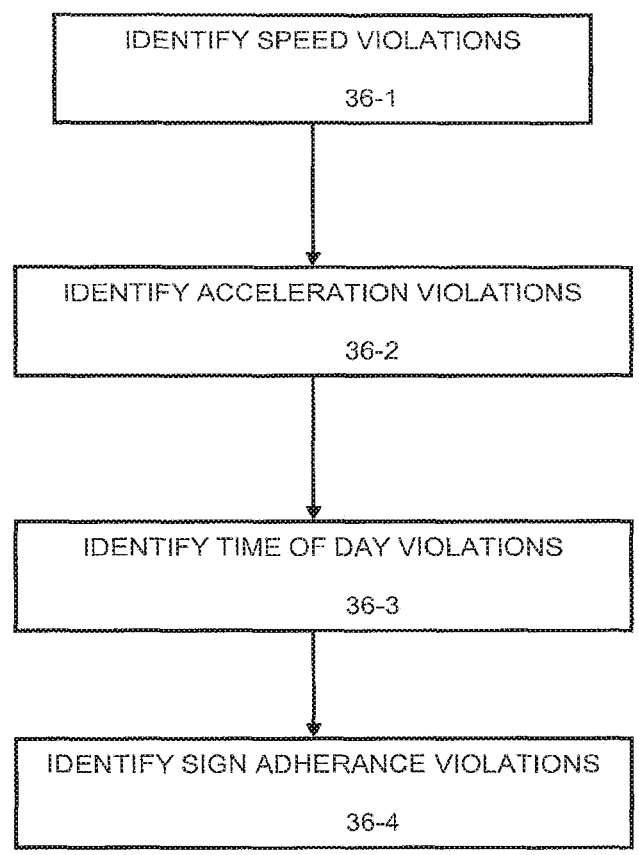
FIG. 10 illustrates the sequential relationship of data evaluation for speed, acceleration, and etc. infractions.

FIG. 10 illustrates the sequential separate relationship of data evaluation for speed, acceleration, etc., infractions. The sequence illustrates the evaluation of uploaded data for speed violations 36-1, acceleration violations 36-2, time of day violations 36-3 (i.e., "deductions" to the DSR for driving at night or high risk weekend time segment), and sign adherence violations 36-4. It will be appreciated that the sequence is illustrative only and may be abridged, supplemented or reordered.

Figure 11:
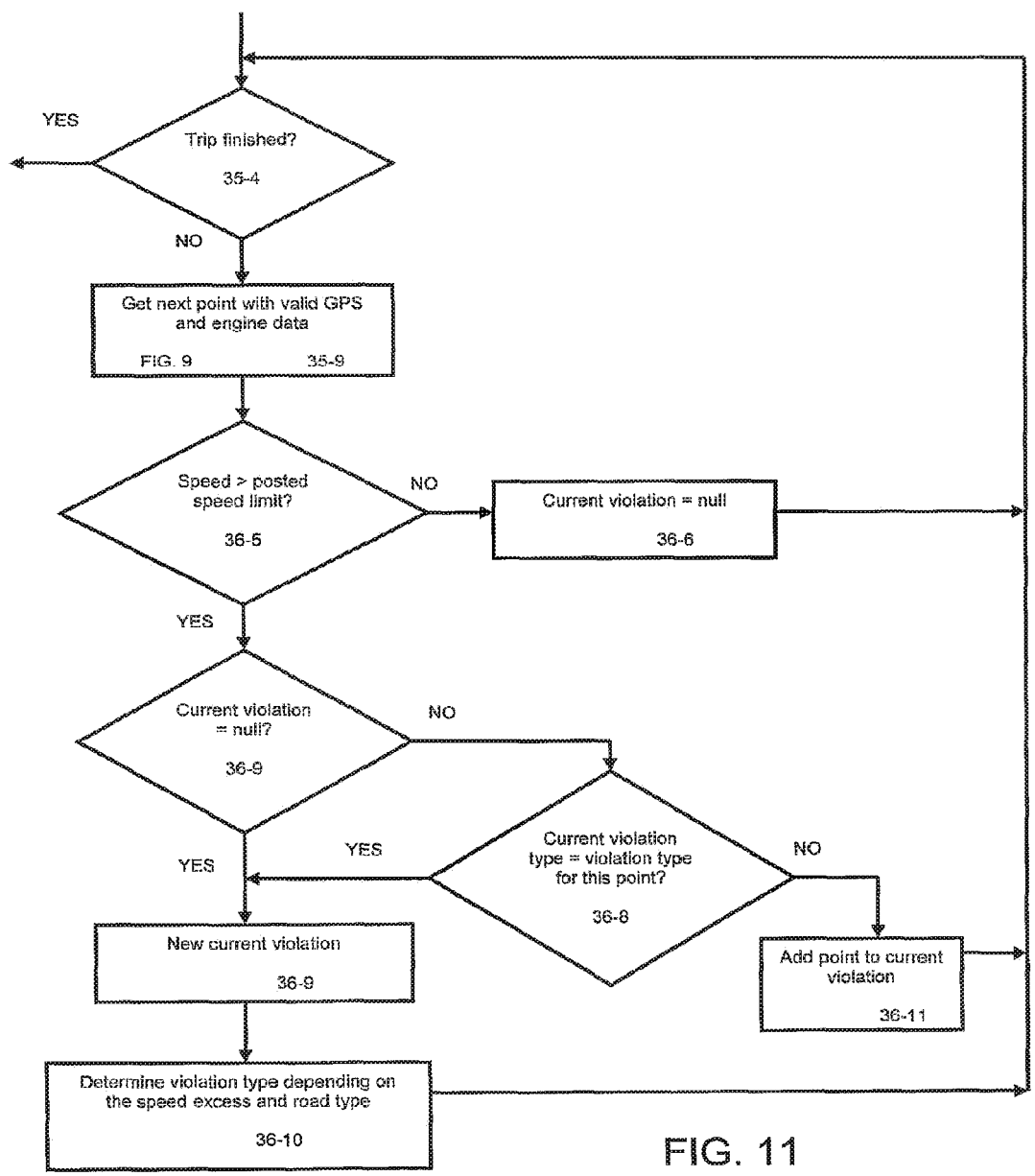
FIG. 11 illustrates the detailed logic steps for determining a speed violation from each time marked data point of vehicle speed with the matrix of recorded information and the assessment of penalty points for the Driver Safety Rating.

FIG. 11 illustrates the detailed logic steps for determining a speed violation from each time marked data point of vehicle speed with the matrix of recorded information and the assessment of penalty points for the Driver Safety Rating. The logic program evaluates the uploaded data to determine whether the trip is finished 35-4. If not, the logic program obtains the next point having a valid GPS and engine data 35-9. (Reference is made to FIG. 9, items 35-4, 35-10, 35-11.) The logic program next queries whether the vehicle speed exceeds the posted limit 36-5. If the posted speed limit is not exceeded, there is no current violation 36-6. If the speed exceeds the posted limit 36-5, the logic program queries 36-8 whether the vehicle is operating at in concurrent violation, e.g., high-risk driving time violation, acceleration violation, etc. If the concurrent violation is of the same type 36-9 i.e., speed violation, the vehicle will be deemed to be operating in a continuing speed violation and DSR point deduction increased 36-10. If not of the same type 36-11, a separate DSR deduction will be calculated. The logic program then again queries whether the trip is finished 35-4. It will be appreciated that this logic sequence may be separate from a determination of whether a selected vehicle operating speed, e.g., 58 mph, is ever exceeded.

Figure 12:
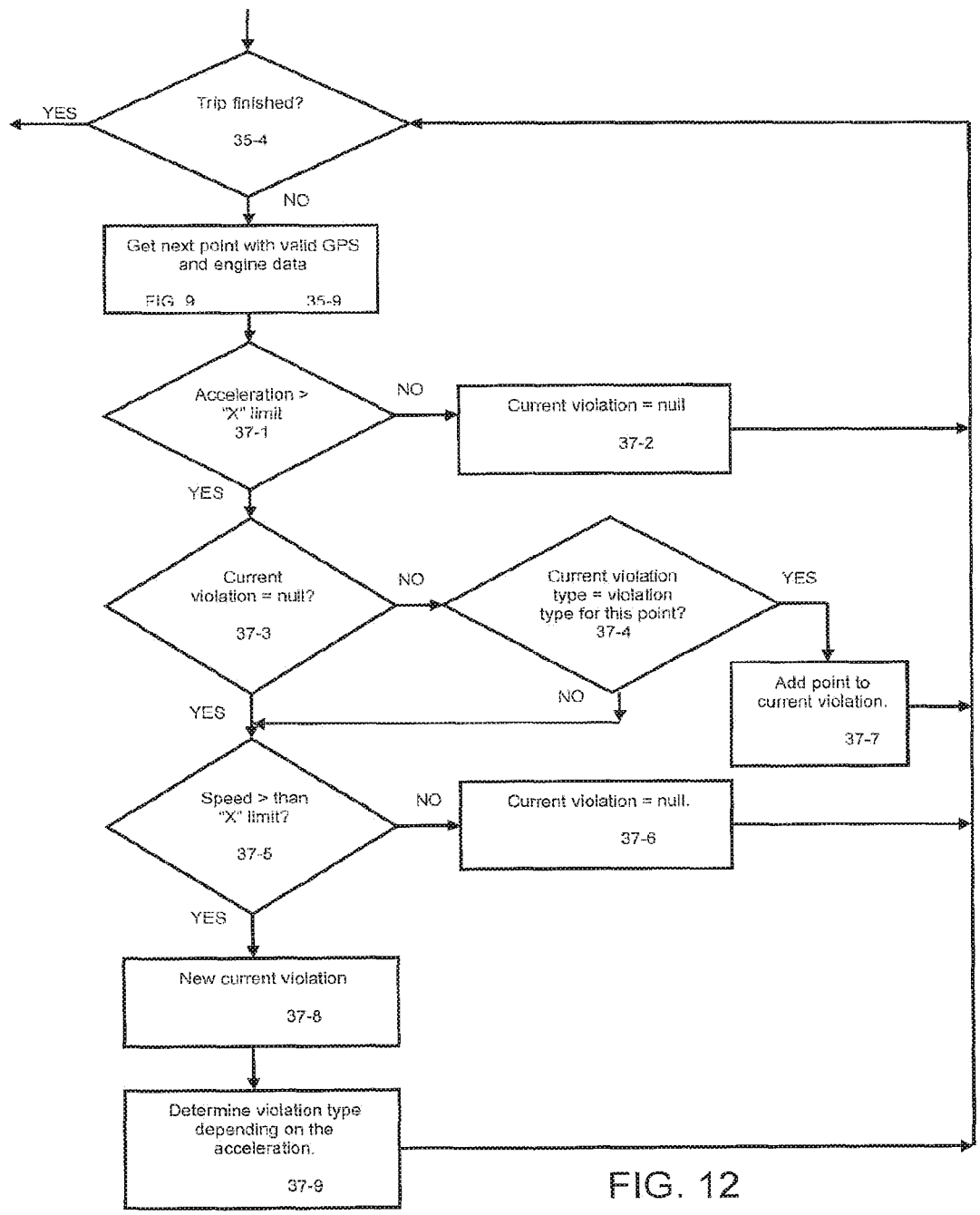
FIG. 12 illustrates the detailed logic steps for continuous evaluation of compute vehicle acceleration and assessment of penalty points for the Driver Safety Rating.

FIG. 12 illustrates the detailed logic steps for continuous evaluation of vehicle acceleration and assessment of penalty point(s) to the Driver Safety Rating. This logic step, which is separate from the speed violation step (reference to FIGS. 10 and 11) starts at the same point 35-4 and 35-9 (reference again to FIG. 9). The vehicle acceleration is separately calculated as illustrated, for example, in FIG. 8 discussed above. Continuing with FIG. 12, the logic program queries 37-1 whether the acceleration exceeds a specified limit. If no, there is a determination 37-2 of no current excess acceleration violation and the logic program returns to the beginning step 35-4. If the specified "x-limit" rate of acceleration 37-1 is being exceeded, the logic program queries 37-3 whether there is a concurrent violation. If there is a concurrent violation, the logic program 37-4 queries whether the violation is of the same type (e.g., continued acceleration in excess of the specified limit) and if yes, the DSR deduction is increased 37-7. If the is no concurrent violation, the logic program continues 37-5 and queries whether the vehicle speed is in excess of a specified limit. (It will be appreciated that a vehicle has a relatively high rate of acceleration in the first moment of movement from a stopped position, but simultaneously has a relatively slow speed.) If the speed is not in excess of the specific "x" limits, there is no violation (current violation=null) 37-6. If the vehicle speed exceeds the specified limit 37-8 (which may differ from the posted speed limit for the road segment as determined with reference to FIGS. 9 and 11), a new concurrent violation is assessed. The new current violation type is then determined 37-9 depending upon the acceleration. The logic program then repeats and returns 35-4 to the query of whether the trip is finished.

Figure 13:
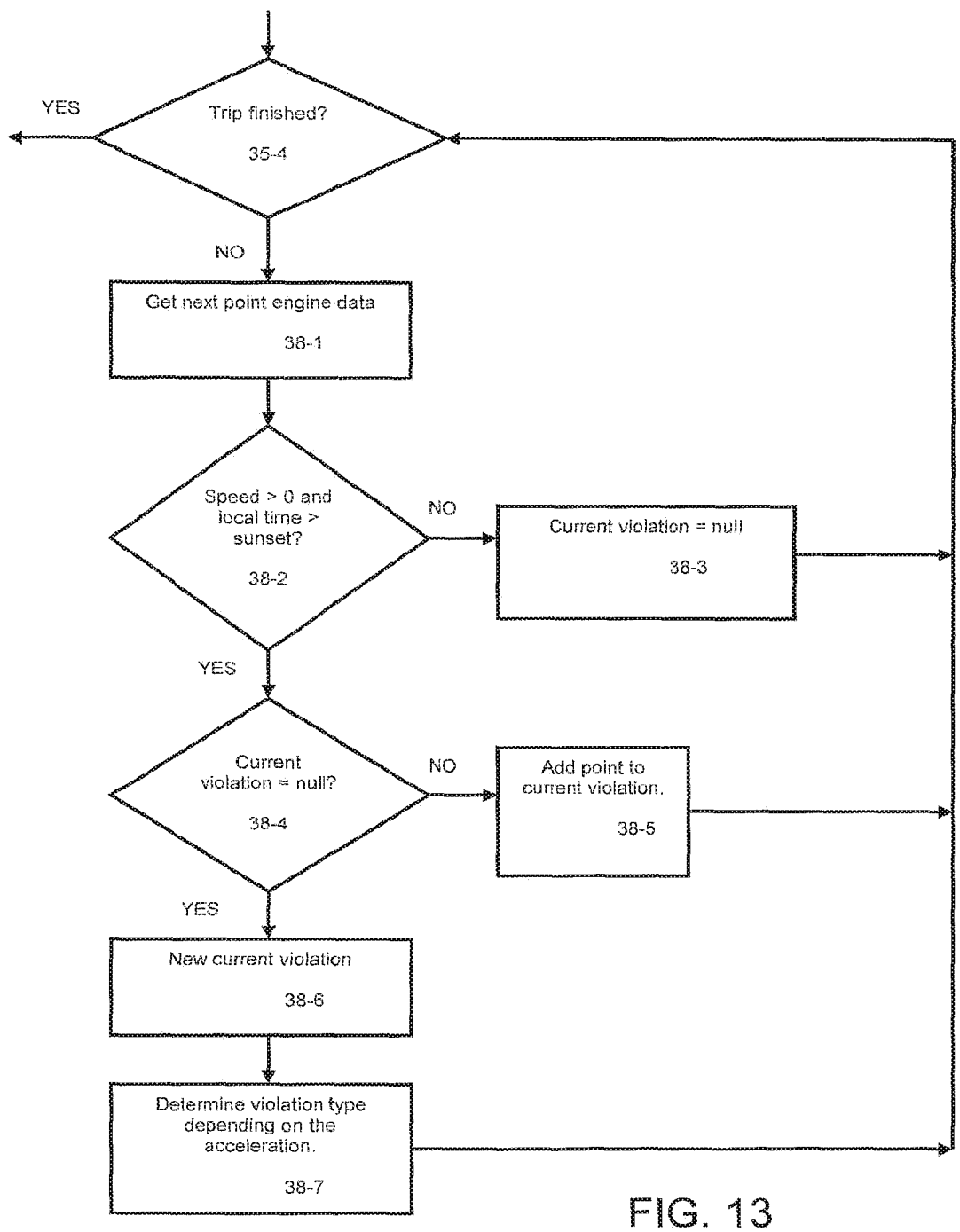
FIG. 13 illustrates the detailed logic steps for evaluation of a "time of day violation" in recognition that driving after sunset is inherently less safe than driving in daylight.

FIG. 13 illustrates the detailed logic steps for evaluation of a "time of day violation" in recognition that driving after sunset is inherently less safe than driving in daylight. The logic program first ascertains whether the trip is finished 35-4. If not, the, the logic program obtains the next point and engine data 38-1. The logic program next queries if the speed is greater than 0 and local time is greater than "after sunset" 38-2. If no, there is no violation 38-3 and the logic program returns to the beginning 35-4. Alternatively, if the speed is greater than 0 and the local time is after sunset, the logic system next queries if there is a current violation 38-4. If there is a concurrent violation (current violation not equaling null), there is an automatic increase 38-5 to the concurrent violation deduction from the Driver Safety Rating. If there is no concurrent violation 38-4, a new violation is assessed for the time of day violation 38-6 and the type, i.e., severity, of violation is in this example illustrated to be determined by the acceleration 38-7 of the vehicle. As an example, if the vehicle is speeding (current violation not equaling null), there is an automatic surcharge 38-5 to the driver safety rating. If there is no current violation, there is a new violation assessed, but if the vehicle is slowing down or at a constant speed (acceleration equal or less than 0) the driver safety rating penalty may be less than if the vehicle is accelerating.

Figure 14:
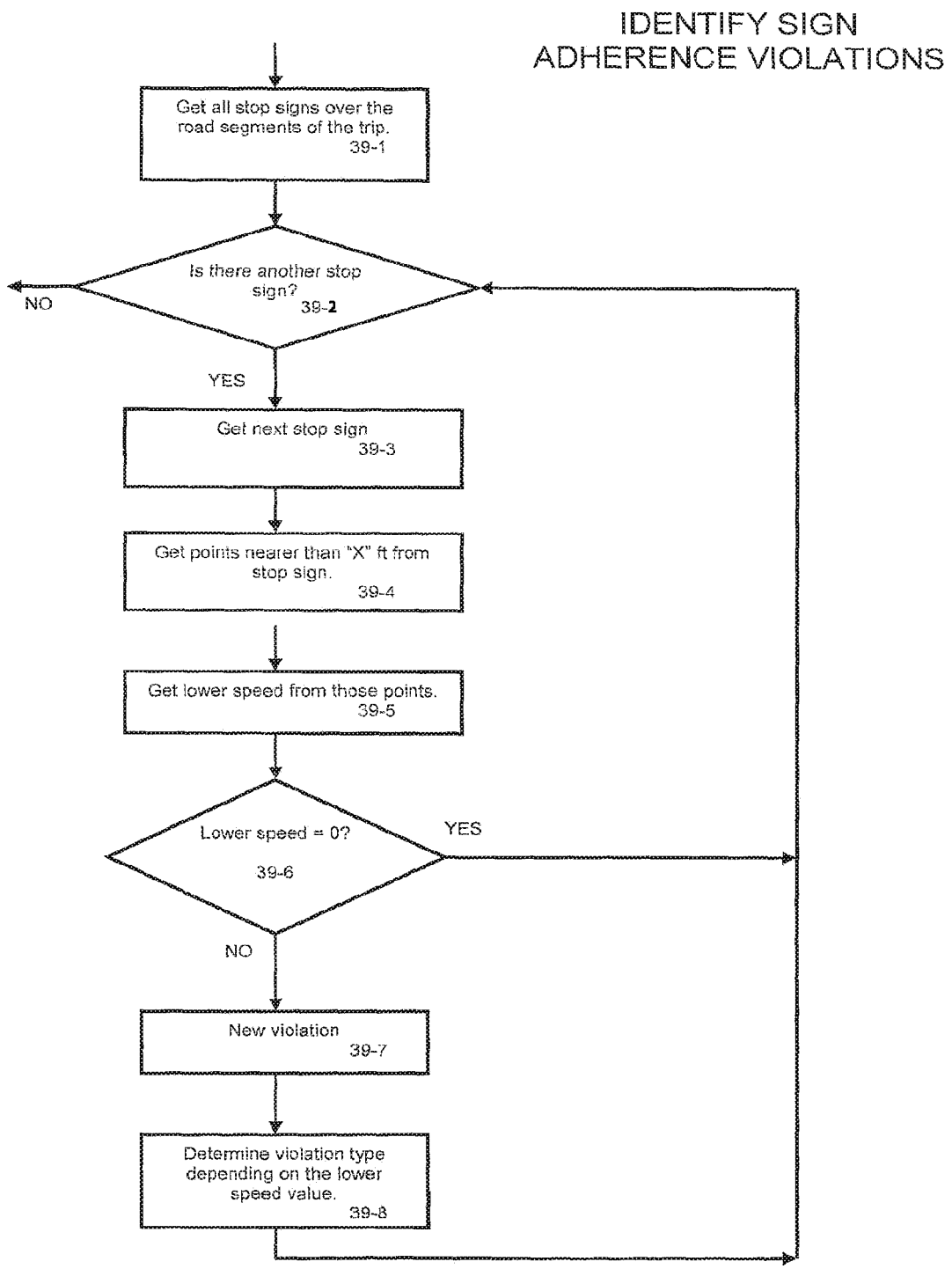
FIG. 14 illustrates the logic steps for continued evaluation of the time marked GPS and vehicle speed data in correlation with a separate database containing road sign information to verify, for example, that the vehicle has been operated in compliance with a stop sign.

FIG. 14 illustrates the logic steps for continued evaluation of the time marked GPS and vehicle speed data in correlation with a separate database containing road sign information to verify, for example, that the vehicle has been operated in compliance with a stop sign. In this example, the logic system determines the route of the vehicle taken during the trip 39-1 and all stop signs located on a separate database correlated with the GPS information are identified. The operation (OBD) data for the vehicle is then correlated with the stop sign locations 39-2. If there is a stop sign 39-3, the logic program looks at vehicle operation within a specified distance before the stop sign 39-4 and particularly the vehicle speed 39-6. If the lowered speed is 0, the logic program determines the vehicle stopped in compliance to the stop sign and there is no violation. If the vehicle speed does not slow to 0 at any location "nearer than 'X' ft from stop sign", the logic program assesses a violation 39-7 based upon failure to stop in compliance with the sign. The violation type, i.e. severity, is determined depending on the lower speed value 39-8. For example the penalty to the driver safety rating will be less if the logic programs determines a "rolling stop" in contrast to the vehicle never slowing below 30 mph, i.e., "running a stop sign". The logic program then returns to the point 39-2 for determining if there is another stop sign.

Figure 15:
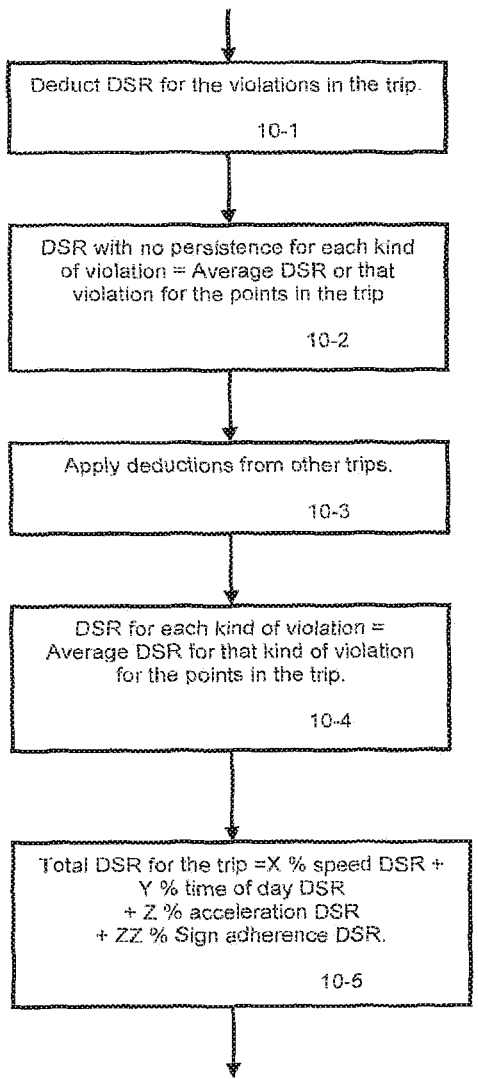
FIG. 15 illustrates the logic steps of an embodiment of the invention wherein the Driver Safety Rating (DSR) is calculated.

FIG. 15 illustrates the logic steps of an embodiment of the invention wherein the Driver Safety Rating (DSR) is calculated for an individual trip. In the illustrated example, the logic program evaluates the violations assessed for the specific trip 10-1 and calculates the DSR deduction 10-2. For example, has the driver previously or frequently violated stop signs and has the driver violated stop signs in the current trip now being evaluated? A deduction, e.g., surcharge 10-3 is applied to the current trip DSR based upon noted persistence in violations. The DSR for the current trip is calculated based upon the specific violations 10-4 assessed during the current trip. A total driver safety rating is calculated 10-5 based upon the relative duration of speed violations in the current trip, the relative duration within the current trip that the vehicle was operated over a selected speed and after sunset and the relative duration of the trip that acceleration was above a specified rate while the vehicle was moving at a specified speed 10-2.

Figure 16:
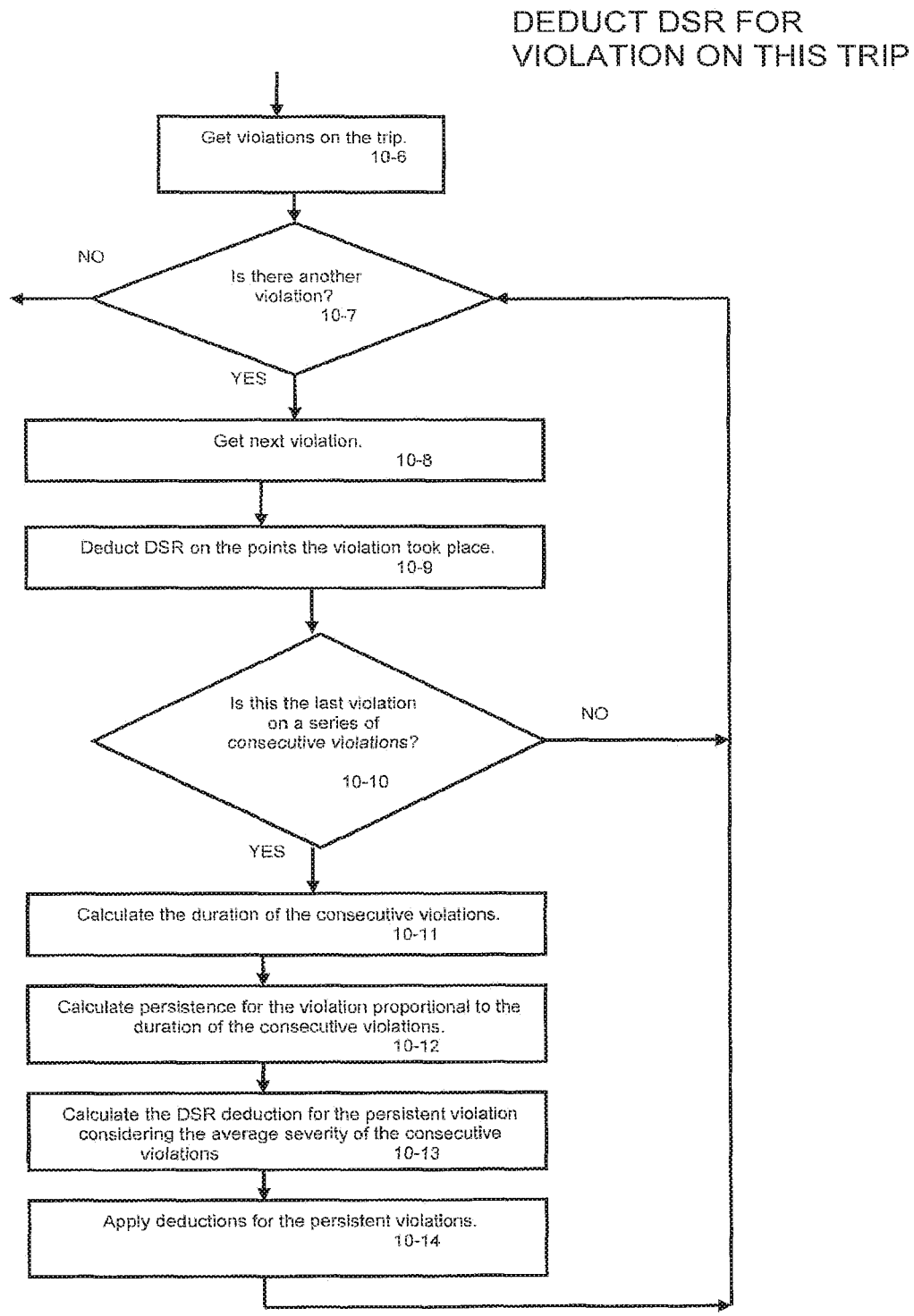
FIG. 16 illustrates the logic steps for deduction of penalty points from the DSR.

FIG. 16 illustrates the logic steps for deduction of penalty points from the DSR. The deduction of penalty points is "for violations on this trip". The violations are first collected 10-6. The logic program can review the trip information and collect each violation 10-7 & 10-8. A deduction is made for each violation 10-9. The logic program also determines if each violation is the last violation of a series of consecutive violations 10-10. If yes, the time duration of the consecutive violation is calculated 10-11. The persistence for the violation proportional to the duration of the consecutive violation is calculated 10-12.

Figure 17:
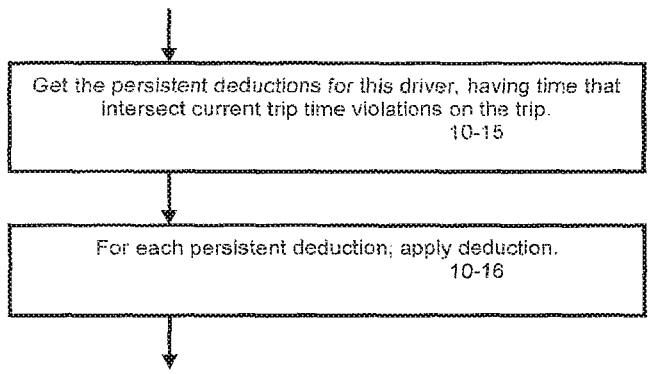
FIG. 17 illustrates the deduction of past penalty points from a calculated DSR for a separate and later driving event.

FIG. 17 illustrates the deduction of past penalty points from a calculated DSR for a separate and later driving event. The logic program obtains persistent deductions for the specific driver 10-15. A deduction is applied for each persistent violation 10-16. Past violations are deemed to be "persistent violations" if there is a sufficient (and variable) time correlation between the past violation and the violation of the current trip being evaluated. There must be a time overlap or "intersect".

Figure 18:
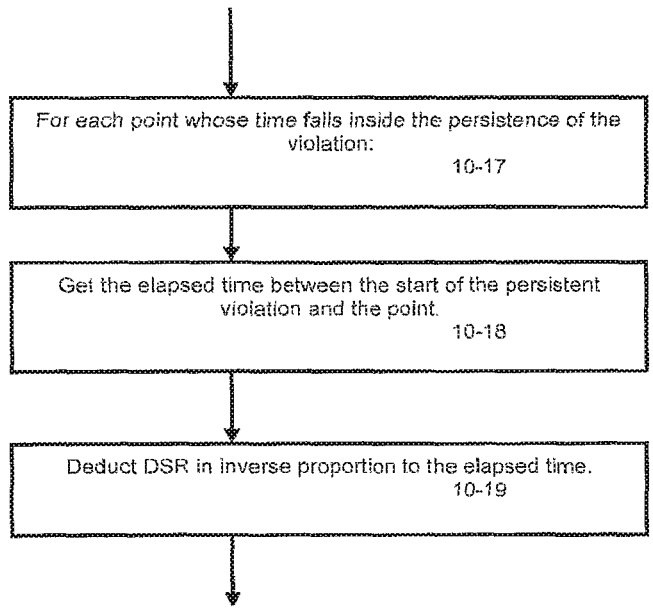
FIG. 18 illustrates the application of past penalties utilizing a weighting scheme based upon penalty weight inverse to elapsed time.

FIG. 18 illustrates the application of past penalties utilizing weighting scheme based upon penalty weight inverse to elapsed time. Again, however, only violations within or "inside" a specified time zone are deemed to be persistent violations and factored into the DSR for the current trip. The extent of the "look back" for past violations may vary depending upon the severity of the violations.

In addition to selection of identifiable vehicle operators, the invention will allow for recording and evaluation of multiple separate trips by a selected driver. The separate trips can be separated by trips of longer than a specified duration, trips in which there are multiple braking events per selected period of time, trips on weekends or at night, in contrast to morning commutes. Also the trips may be separated, evaluated and contrasted over time. Of course, numerous other variations may be implemented and are within the scope of this invention.

The driver safety rating (DSR) score of one embodiment of the invention maybe a composite number comprising subscript or superscript notation. For example the subscript may indicate the number of driving events evaluated in creating the rating score. It may alternately provide the percentage that is Interstate, controlled access highway driving. In another embodiment, the score may contain a superscript notation indicating the number of recorded severe driving violations, e.g., operating over 90 mph.

It will be readily appreciated that changes in sequentially recorded vehicle speed can be used to calculate the rate of vehicle acceleration. See FIG. 8. Changes of vehicle position between intervals where there is no recorded vehicle speed, particularly in conjunction with immediate prior de-acceleration, may indicate that the vehicle is skidding. Minimal change in vehicle position relative to rapid acceleration may indicate the vehicle is being operated without sufficient traction, i.e., "spinning the wheels" or "pealing rubber".

Operation of the vehicle without headlights, changes in vehicle direction without turn signals, etc. may also be recorded. The frequency and degree of changed vehicle direction per unit of distance traveled can indicate lane weaving or, alternatively, driving on a winding road. The vehicle speed, calculated rate of acceleration/de-acceleration, number and duration of brake activation can all be correlated to assess the operator's performance and driving behavior. Frequent changes in vehicle speed and braking events may be indicative of aggressive driving such as tail gating slower moving traffic and lane weaving. Since the data is collected centrally, comparisons can be made between drivers and driver profile types can thus be created.

In one embodiment of the invention, the evaluation of data comprises events of vehicle speed, compliance with traffic signs and signals, vehicle acceleration and 20 time of day. See FIG. 10.

Current driving behavior may be predictive of future driving behavior. Driving behavior can be assessed from a history of driving infractions, e.g., speeding tickets, and from motor vehicle accident histories. Also included within the invention is predictive modeling of future behavior as a function of recorded data an individual driver compared with other drivers within a database. The predicted likely future behavior may be future driving or, with careful or sophisticated evaluation of data, may be predictive of other behavior.

The invention includes creating a database of multiple drivers. The invention also includes categorizing driving conditions of similar nature, thereby allowing performance of multiple drivers at differing times and locations to be grouped and compared. For example, segments of a trips occurring on a multi-lane divided and limited access highways can be grouped and evaluated. The road type may be determined by combining GPS data and separate databases showing the number of traffic lanes, exit and entrance points, etc. Alternatively, road type may be determined solely by accumulated trip recorded time sensitive GPS and operational data, such a vehicle direction, speed, braking, and acceleration. Congested urban traffic conditions can be identified by time and location and categorized. Identification may include consideration of the number of drivers within the database proximate to particular locations at particular times relative to other locations. This may be termed "use" or road use.

Typical or average driving patterns can be identified within such categories of road type. Comparison of an individual driver's operational data to the average or typical operation profile can be made and deviations noted. With an adequate database, other types of driving conditions or road types may be identified and categorized. Individual driver operational data can be compared with the typical or average driver profile. Information from such comparisons can be combined and evaluated with demographic variables or other recorded factors and separate database information such as driver age, sex, marital status, purchasing and credit histories, etc. Evaluation can also be made between the driving profile and history of driving infractions or accidents.

The combined data and evaluations can be useful in predicting likely future behavior, including differing lifestyle and employment environments. In addition, categories of driver personality type can be created and an individual can be matched with one or more categories. The measurement of relationship strength of an individual to a category may utilize standard deviations of predicted co-occurrence or log-likelihood ratios.

Since the invention included creation of a comprehensive database without prior filtering or evaluation, it is possible for example, to revise or adjust one or more algorithms used in an evaluation. It is possible to similarly make changes in the evaluative technique or methodology. This can result, for example, in achieving enhanced predictive analysis. Predictive results can be compared to actual results and the technique refined to achieve greater consistency or accuracy.

An individual driver may also be categorized by the absolute amount of time the driver is identified to be operating within a road category or trip segment. Also, an individual driver may be evaluated by the relative portion of each trip that is within a road category. Driving in "off peak" times may differ from "rush hour" vehicle operation. Similarly, predictions of likely future behavior may vary with drivers operating vehicles at differing times or on differing road types.

Changes in an individual driver's profile may be noted and may be suggestive of a change in life style or employment. This may be correlated to spending and credit histories. Time sensitivity can enhance the predictive value of a profile.

Evaluation of discrete trip segments, in contrast to evaluation of operation for an entire trip can also enhance the predictive value. For example, all trips that include a first GPS determined point A and then point B within a five minute window and occurring between 8:00 AM and 8:30 AM on one or more specified dates may capture all the drivers operating a vehicle in a certain direction of a major arterial roadway on a "rush hour" morning. Operation on other and differing road segments may not be of value. In this limited "like" environment, it will be relatively easy to identify drivers whose speed, braking and acceleration pattern differ from the average. It will also be relatively easy to identify "aggressive": driving. A pattern of aggressive driving may be correlated to "risk taking" in other life or employment environments, including but not limited to spending and debt repayment. The evaluation may be further enhanced by tracking the changes in vehicle direction within the road segment, i.e., the driver's proclivity to change lanes.

This level of evaluation of individual driver behavior can also be reflected in the driver's safety rating score. It may be useful to have such information separately recorded as a subset of a composite score. Driver's that have an "aggressive" driving profile or that frequently operate on "high risk" road segments and/or times can be therefore be readily identified and distinguished from otherwise similar drivers. In the preferred embodiment, the aggressive driver score would be separable from the "high risk" road segment driver.

It will be readily appreciated that vehicle driving is a common activity of most individuals over the age of 16. Although driving and traffic conditions vary widely, it may be appreciated that common behavior traits may be exhibited through vehicle operation. It will be readily appreciated that an individual that can demonstrate a history of prudent driving in combination with prudent spending and use of credit may be part of an ideal target market of certain goods or services. Other drivers may choose not to provide such vehicle operation data for various reasons. These reasons can include that concern that the information would demonstrate less than ideal behavior, such as perceived high risk driving characteristics. For some purposes, it may be useful to exclude those individuals from the evaluation. Thereby the database is not flawed by their absence. For other purposes, such absent individuals that are otherwise identifiable may constitute the target audience or market. Again, the database is not flawed. For example, a person having a certain high spending and credit profile, but not reporting vehicle operations data may be particularly receptive to an ad campaign for luxury sports cars or certain vacation travel. The ability to identify or merely the enhanced ability to identify members of a target segment will be a valuable tool.

Another aspect of the present invention is to identify events or behavior that have a strong co-occurrence index or similar frequency of occurrence. For example rapid acceleration may frequently occur with hard braking. It may also occur with closely following other vehicles. Frequent lane changes without activating turning signals may be correlated with rapid acceleration but lane changes with use of turning signals may not have a similar correlation. However, frequent lane changes without turning signals on congested urban corridors during rush hour may have a different correlation compared to frequent lane changes without turning signal during off peak hours on the same type roadway. The latter may be correlated to with excessive speed while the former is not.

In another example, a driver operating a vehicle primarily on suburban streets during daytime hours may have minimal correlation to excessive speeding. Conversely, such driver may have minimal demographic or economic commonality to drivers that demonstrate excessive speeding. It may be useful to exclude both from an evaluation. Therefore being able to determine where and when the driving occurs may be as important as how it occurs.

Further, the invention allows behavior or characteristics of drivers to be compared to other driver, independent of other factors. For example, all vehicles on a congested roadway may be operating below a posted speed limit. However, some drivers may be exhibiting frequent lane changes without turn signals, accompanied by high acceleration, hard braking and tailgating. No driver is operating above the speed limit, but some are exhibiting high-risk behavior. In another example, a comparison of drivers on the same road segment during a recorded rain event can be compared. How a driver is operating in comparison to the other drivers during the rain event may be more predictive of behavior than adherence to posted speed limits.

Another aspect of the invention is the enhancing the predictability of likely future events by identifying the most predicative characteristics within the database and match the occurrence of one or more characteristics within the data set of an individual. A scaled score can be developed for the individual based upon the individual's dataset.

For example, none of a subset of drivers who are identified as principally driving on suburban streets may have traffic infractions. However, some drivers within the group may have recorded multiple events of "rolling stops" at stop signs. Some drivers may have multiple events of changing direction without using turning signals. Others may frequently drive without seat belts. Over time, one or more of such characteristics may be strongly correlated to other significant behavior or behavior of interest such as high-risk life style behavior, whether driving related or otherwise. Other factors may not show a strong correlation with other behavior of interest and may be discounted. Drivers identified as driving with significant frequency on congested urban arterial roads may be shown to have a correlation with other aspects of behavior. Therefore, over time some behavior may be shown to have a strong correlation with other behavior. The other characteristics (having a low index of frequency of correlation) may be thereafter discounted as predictive of the correlated behavior of interest.

As suggested above, another aspect of the invention is to identify and utilize characteristics that can be identified by sophisticated evaluation of the database that focus on prediction of responsiveness to certain input, e.g. an ad campaign or new product, in contrast to the odds of a future traffic accident or infraction. Such evaluation may include correlation of separate databases.

It will be further appreciated that evaluation of these additional or alternative variables will require minimal adjustment to the logic flow diagrams (FIGS. 3 through 18). For example, driving after selected times on Friday and Saturday evenings may be rated independent of other variables since these times may be statistically the most dangerous times. Again, the time of vehicle operation, and designation of the driver, will be included in the data set of the preferred embodiment.

FIGS. 19A, 19B, 19C and 19D comprise a table of actual recorded time marked speed data and assessed violation/penalty utilizing an embodiment of the invention. FIGS. 19A through 19D comprise a table of data points collected from an actual motor vehicle trip 19-1, utilizing OBD and GPS components, and evaluated 19-2 by the subject invention. The table presents only collected data points in which a speed violation 19-6 was recorded. It will be appreciated that the table could present vehicle speed information for each sequential data point regardless of an excess speed event (or other recorded vehicle operation characteristic). In the event depicted in FIGS. 19A through 19D, the trip started at a time prior to 1:55:29 PM on Dec. 29, 2003. The vehicle speed was collected every 2-seconds and the vehicle position was also recorded at the same 2 second intervals. Both recording devices utilized atomic clocks to regulate time intervals and synchronization. A database containing speed limit information 19-4 applicable to the specific road and location traveled was accessed by the processor evaluating the data. The actual vehicle location was derived by the GPS supplied information.

For the driving event ("trip") subject of FIG. 19, the identity of the driver is disclosed. The actual speed is recorded and compared to the posted speed limit for each time marked interval.

A driver safety rating (DSR) 19-8 is established upon the evaluation of the data. In the driving event subject of FIG. 19, only driving speed having been recorded as exceeding the pre-selected criteria, i.e., posted speed limit has been displayed. (See for example 19-3, 19-5 & 19-6.)

For example, in the embodiment of the invention illustrated by FIG. 2, a driver safety rating is established by first evaluating the recorded data of FIG. 1 in accordance with a formula and subtracting the resulting numerical value (a) from 100 where 100 represents optimally safe motor vehicle operation. The formula utilized in this embodiment is:

$$\sigma = (V^2 - L^2)/(L\dot{x}) \text{ where}$$

σ=driver safety rating speed violation deduction
V=vehicle speed recorded from OBD
L=posted speed limit obtained from a GIS database utilizing the GPS location stamp for the data interval.
x=adjustment factor to normalize the deduction to a basis DSR of 100.

As stated above, the driver safety rating (DSR)=100−σ

In another embodiment, the product of the calculation can be adjusted by a factor (μ) where μ=an adjustment factor for traffic conditions, weather conditions or time of day. It will be readily appreciated that operation of a vehicle at a speed in excess of the posted limit may be subject to a greater penalty or evaluative numerical significance if occurring in rain, icy conditions, nighttime, etc. Other factors which may justify a further adjustment criteria would include operating a vehicle in excess of the posted speed in a school zone, during rush hour or on roads that have statistically higher accident rates.

It will be further appreciated that the information contained in the table comprising FIGS. 19A and 19B illustrates the one data collection sequence that may utilized and recorded on the transferable electronic memory media and downloaded to a separate processor.

Figure 20:
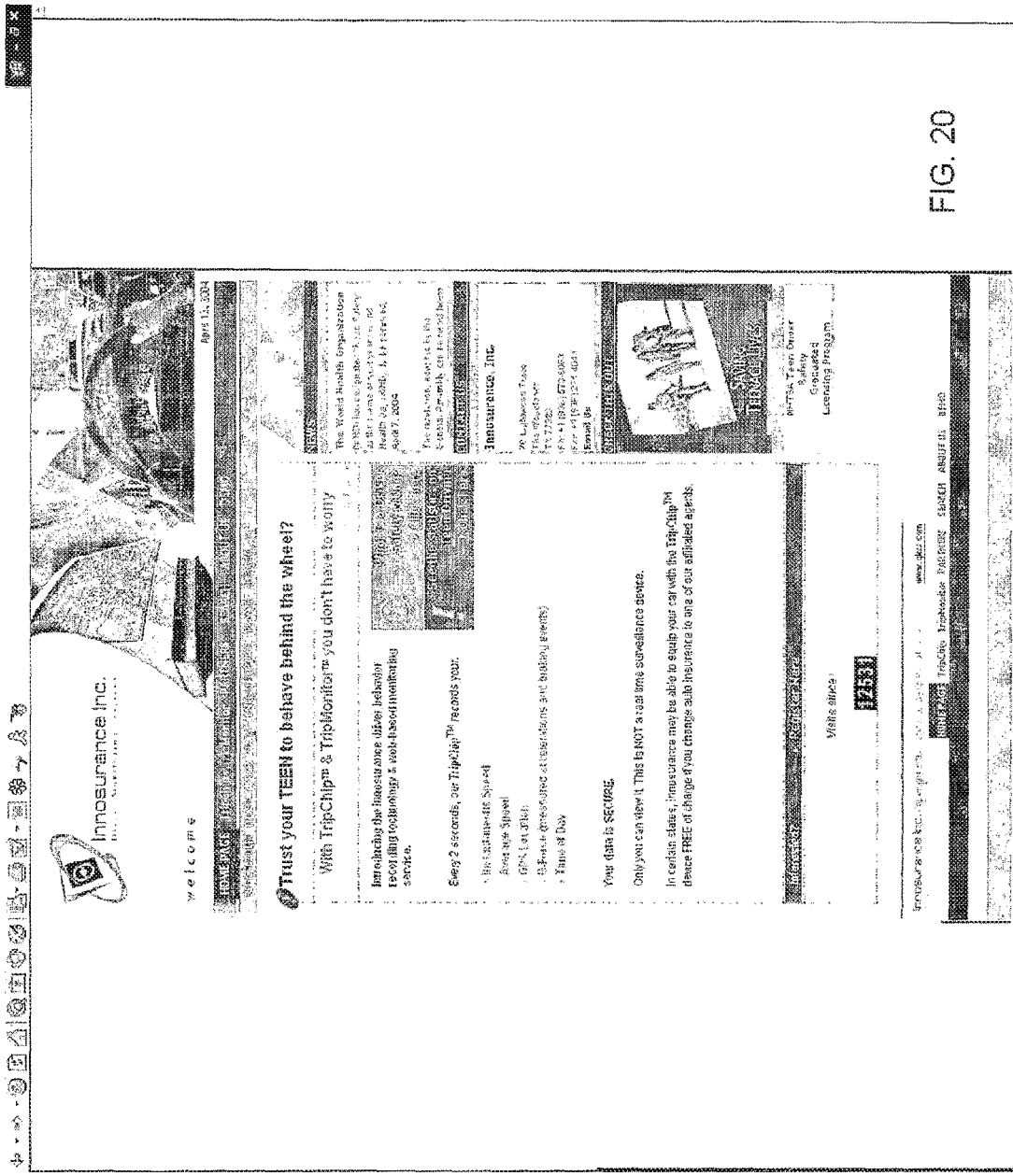
FIG. 20 illustrates the home page displayed to a user of an embodiment of the invention that incorporates the logic flow sequences illustrated in FIGS. 2 through 18 herein.

FIG. 20 illustrates the home page displayed to a user of an embodiment of the invention that incorporates the logic flow sequences illustrated in FIGS. 2 through 18 herein.

FIG. 21 illustrates the log in page displayed 21-1 to a user of an embodiment of the invention.

Figure 22:
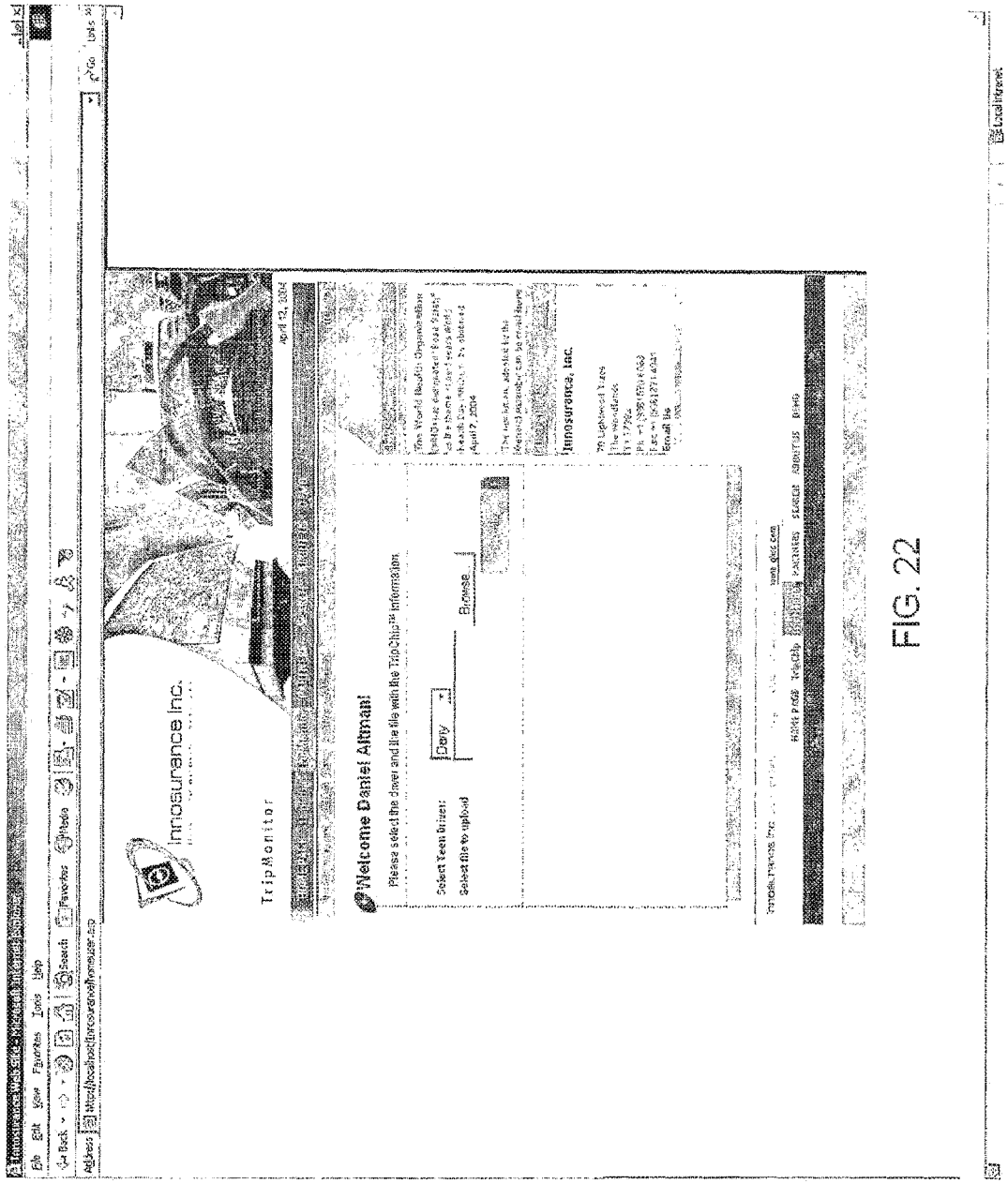
FIG. 22 illustrates the screen page displayed to the user after logging into the invention and allowing the user to select among multiple drivers having recorded driving data uploaded within the database of the invention.

FIG. 22 illustrates the screen page displayed to the user 22-1 after logging into the invention allowing the user to select 22-2 among multiple drivers having recorded driving data uploaded within the database of the invention.

FIG. 23 illustrates the screen display allowing the user to view various driving events 23-1 of the selected driver 23-2 that are within the invention database and for which a Driver Safety Rating 23-3 has been computed.

Figure 24:
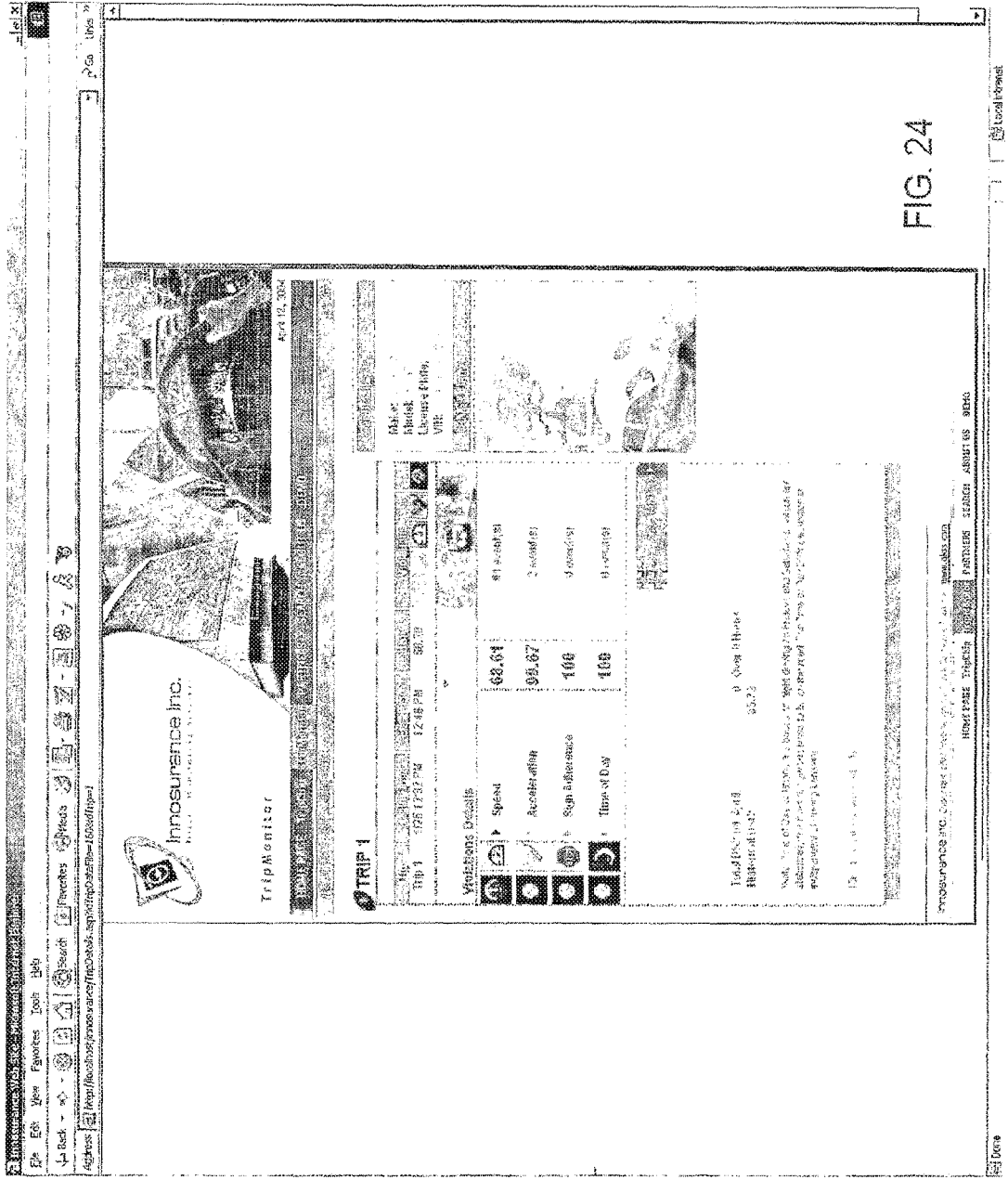
FIG. 24 illustrates the screen display providing the type of violation and computed DSR for each violation types for a selected trip.

FIG. 24 illustrates the screen display providing the type of violation 24-1 and computed DSR 24-2 for each violation type for a selected trip 24-3.

FIG. 25 illustrates the screen display of evaluated trip data derived from the matrix of time and location marked data. FIG. 25 is a presentation of information of the type of information of FIGS. 19A through 19D as it may appear on a user's computer screen.

Figure 26:
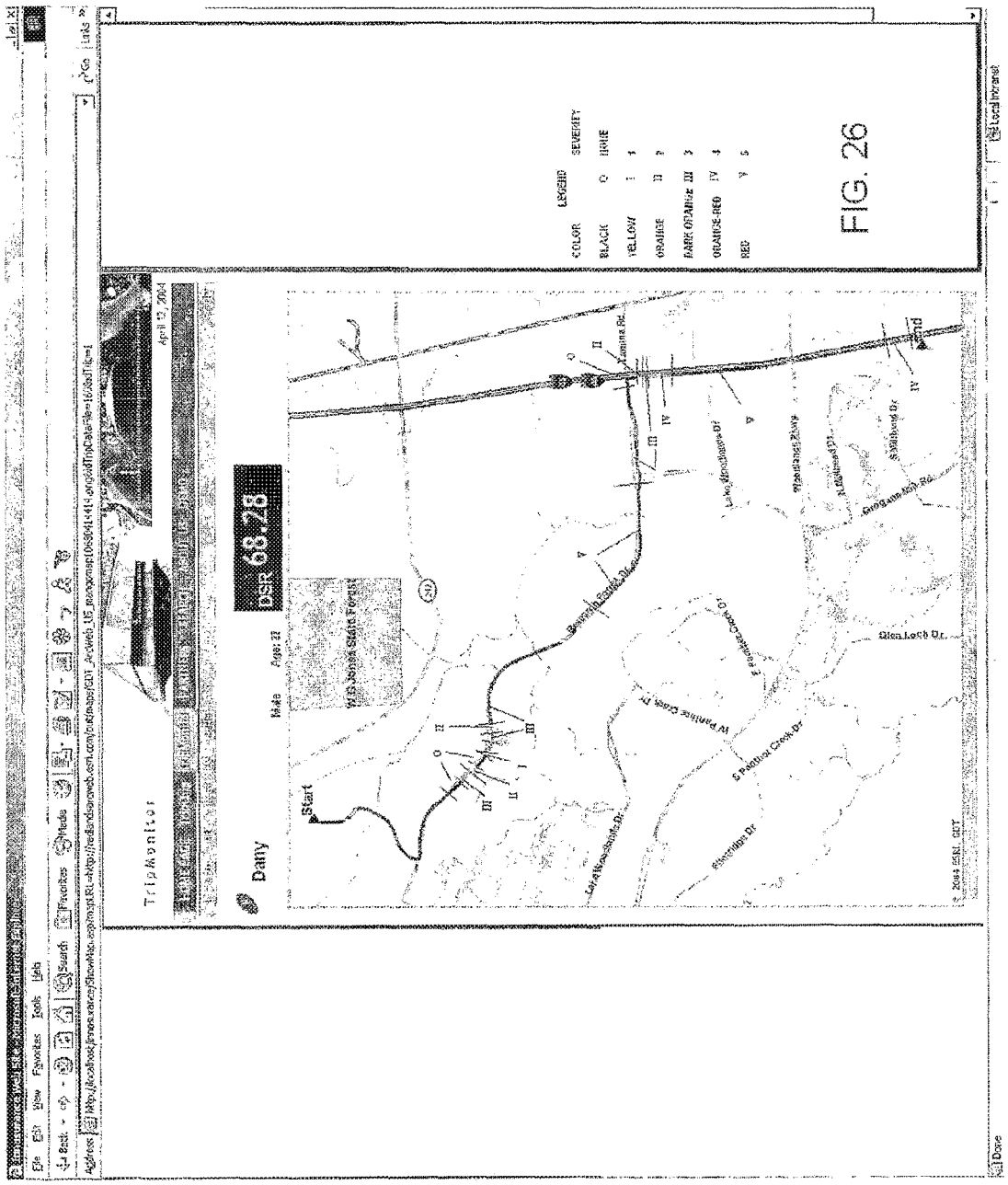
FIG. 26 illustrates a map of the actual travel of the vehicle as recorded and evaluated based upon several databases utilizing the time marked and location marked data.

FIG. 26 illustrates a map of the actual travel of the vehicle as recorded and evaluated based upon several databases utilizing the time marked and location marked data. FIG. 26 is a presentation of the GPS data 26-1A, 26-1B, 26-1C. 26-2 & 26-3, collected as part of the data set forth in FIG. 25, as it may appear on the user's computer screen and illustrating the actual route of vehicle travel. The designated path of travel may be further color coded 26-4 or otherwise marked to show the specific location of the event of excess speed or other characteristic included in the evaluation determining the driver safety rating.

FIG. 27 is a representation of the display screen of the invention showing the streets 27-1 traveled during a selected driving event as well as the time 27-2A & 27-2B and speed limit 27-3. The screen can be modified to incorporate other information.

Looking at FIGS. 8 and 9, it will of course be appreciated that sequential data of speed can be used to calculate the rate of acceleration. This can be either a positive or negative value with a negative value indicating de-acceleration. For example, in one embodiment of the invention, the evaluation of data may utilize the following formula:

$$\phi = (A - 0.6)/(L\dot{y})$$

$$A = (V_1 - V_2)/t$$

where
φ=driver safety rating acceleration deduction
$V_1$=vehicle velocity from the previous time interval recorded from OBD
$V_2$=vehicle velocity from the current time interval recorded from OBD.
t=time increment between data points
L=speed limit
y=adjustment factor to normalize the deduction to a basis driver safety rating of 100.
0.6=threshold G-Force above which violations are recorded.

As with speed, the acceleration factor may be subject to a further adjustment (μ) for traffic, road or weather conditions as well as for time of day, etc.

In another embodiment, the rating may include the operator's adherence to traffic control signs and traffic signals (Ø). This embodiment will require synchronized GPS and OBD data. An example of application of this capability would be failure of the vehicle to stop at a geographic location, as determined by the combined and time synchronized GPS and OBD data, known to be controlled by a stop sign. This can be viewed as an enhancement of the tracking speed with posted speed limits.

Yet another embodiment may utilize a separate factor (β) for travel at night or at determined road locations known to have greater accidents. Travel on Interstate highways traversing relatively sparsely populated and un-congested areas may understandably present different operating challenges and demands than equal mileage driven in congested urban streets and expressways with greater traffic density, frequently merging traffic and changing traffic speed. Similarly, the drivers' behavior, as well as driving skill, can be measured by the information metrics of the type depicted in FIG. 1.

In yet another embodiment, the driver safety rating will be weighted to reflect the number of separate operating events or the cumulative vehicle operation marked data that is incorporated in the rating. A rating that is a product of the evaluation of numerous events can be expected to have a greater accuracy or greater predictive values for other or future behavior.

The driver safety rating comprising an evaluation of multiple factors, e.g., speed, rate of acceleration, sign adherence and time of day/location, will be an integration of the recorded and derived factors. In one embodiment, the DSR will be a deduction of the evaluated numerical value from a beginning 100 score. The numerical value will first require computation of the DSR for each time-marked interval, e.g., each two-second interval for which OBD, GPS, etc., data is collected for evaluation.

For example, in a simple calculation involving the four variables listed above, each variable can be given equal weight (with or without incorporating modifying factors such as μ). In that case, the deduction for each time interval ($DSR_{INTERVAL}$) can simply be expressed as the average of the four values for that interval.

$$DSR_{INTERVAL} = (\sigma + \phi + \varnothing + \beta)/4$$

The $DSR_{TRIP}$ will then be:

$$DSR_{TRIP} = 100 - (\Sigma\ DSR_{INTERVAL})/t$$

The invention includes altering or adding additional variables and varying the evaluation as may be selected, utilizing recorded and uploaded data of vehicle operation as taught by this invention.

The evaluation process can also discard old or "stale" information that may be expected to no longer have significant predictive value. The criteria for discarding data may be a time function only, or incorporate the quantity of later data collected. The evaluation process can also incorporate a persistence factor for events of selected significance. These may be events of driving at speeds in excess of 20 mph over the posted speed limit. The rating evaluation process may retain the data or numerical values for a longer duration than data or values pertaining to driving less than 10 mph above a posted speed limit. This process can utilize the "severity" value listed in the table of FIGS. 19A through 19D.

Additional variable factors that may be subject of analysis include the number of changes in rate of acceleration (including de-acceleration) per linear distance traveled, number of changes in vehicle direction per linear distance traveled, use of seat belts, turning signals, activation of ABS or SRS systems, lane departure warning systems or intelligent cruise control systems, etc. Driver physiological data such as heart rate and blood pressure may be recorded and included in the analysis.

The invention also teaches real time feed back to the driver. This can include warnings of driving above a posted speed limit, warning that the vehicle is approaching a stop sign, or the time remaining before a traffic control light is to change from green to yellow or red, etc. It may provide notice of construction or other traffic delays. This embodiment utilizes real time access correlation and evaluation of multiple databases.

The evaluation can also include quantitative assessments, such as an evaluation based upon changes in vehicle direction, determined from steering wheel movement, time, and vehicle speed. This can be correlated with GPS data for validation as indicated above. The data can then be further qualitatively assessed for excessive speed during turning events, excessive lane changes, "tail gating", etc. The qualitative assessment can include assigning numerical values for events. Events can be qualitative distinguished, i.e., an event of excessive driving speed, an event triggering the ABS or SRS system, could have a differing impact than an event of failure to activate turning signals.

An additional embodiment could include measurement of driver performance for a driving event or for operation per hour. The measurement can be stored and supplemented by additional driver specific driving events. Therefore changes in driver behavior over time can be evaluated, thereby providing a current, accurate assessment of behavior. With progression of time or collected events, it may be possible or advantageous to delete early events and data.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What is claimed is:

1. A vehicle data collection and evaluation system comprising:
    a mobile phone comprising:
        a locator;
        a time marker;
        a first memory;
        a wireless receiver and wireless transmitter; and
        a first processor;
    wherein the mobile phone is configured to:
        collect driving representative data,
        time mark the driving representative data at intervals of up to about two seconds using the time marker,
        store time marked driving representative data in the first memory, and
        wirelessly transmit the time marked driving representative data,
    wherein the time marked driving representative data comprises at least one of (i) time marked location data; and (ii) time marked speed data, and
    wherein the mobile phone is configured to:
        determine vehicle acceleration by using the time marked driving representative data to:

identify elapsed time between at least two data points from the time marked driving representative data, determine a change in speed between the at least two data points, and calculate the vehicle acceleration between the at least two data points based on the change in speed, and determine a driver safety rating using the calculated vehicle acceleration.

2. The system of claim 1, wherein the mobile telephone further comprises a display and is configured to display at least one of the driver safety rating and the vehicle acceleration.

3. The system of claim 1, wherein the system is further configured to associate at least one of the vehicle acceleration and the driver safety rating with an individual driver profile.

4. The system of claim 3, further comprising:
a server comprising:
  a second processor;
  a receiver and transmitter, and
  a second memory;
wherein the server is configured to:
  receive information associated with the individual driver profile;
  record the information; and
  transmit to a user device associated with the individual driver profile the information associated with the individual driver profile.

5. The system of claim 2, wherein the mobile phone is further configured to determine whether the calculated vehicle acceleration exceeds a vehicle acceleration threshold; and
  display a notification that the vehicle acceleration threshold has been exceeded.

6. The system of claim 1, wherein the time marked driving representative data includes first data collected from a first vehicle data acquiring component and second data collected from a second vehicle data acquiring component, wherein the first data acquiring component is distinct from the second vehicle data acquiring component.

7. The system of claim 6, wherein the vehicle acceleration is determined from the first data collected from the first vehicle data acquiring component, and
  the mobile phone is further configured to determine a comparative vehicle acceleration from the second data collected from the second vehicle data acquiring component; and
  compare the vehicle acceleration determined from the first data to the comparative vehicle acceleration determined from the second data to assess the accuracy of the vehicle acceleration determined from the first data.

8. The system of claim 1, wherein the mobile phone is further configured to:
  compare the time marked driving representative data to average driving data associated with an average driver profile;
  determine deviations between the time marked driving representative data and the average driving data; and
  record in an individual driver profile the deviations.

9. The system of claim 1, wherein the time marked driving representative data includes data collected over a first trip traveled by a vehicle;
  the driver safety rating is determined using the data collected over the first trip; and
  the driver safety rating is indicative of a driver safety rating for the first trip.

10. The system of claim 1, wherein the time marked driving representative data includes data collected over a first road segment traveled by a vehicle;
  the driver safety rating is determined using the data collected over the first road segment; and
  the driver safety rating in indicative of a driver safety rating for the first road segment.

11. A vehicle data collection and evaluation system comprising:
  a mobile device comprising:
    a locator;
    a time marker;
    a first memory;
    a wireless receiver and wireless transmitter; and
    a first processor;
  wherein the mobile device is configured to:
    collect driving representative data,
    time mark the driving representative data at intervals of up to about two seconds using the time marker,
    store time marked driving representative data in the first memory, and
    wirelessly transmit the time marked driving representative data;
  wherein the time marked driving representative data comprises at least time marked location data;
  a driving evaluator comprising:
    a second processor;
    a receiver and transmitter, and
    a second memory;
  wherein the driving evaluator is configured to:
    receive the time marked driving representative data transmitted by the mobile device;
    determine vehicle acceleration without using collected or calculated speed data; and
    determine a driver safety rating using the vehicle acceleration.

12. The system of claim 11, wherein to determine vehicle acceleration without using collected or calculated speed data the driving evaluator is configured to:
  determine a first distance traveled and a first elapsed time between a first location point and a second location point from the location data and the time data;
  determine a second distance traveled and a second elapsed time between the second location point and a third location point from the location data and the time data; and
  calculate the vehicle acceleration between the first location point and the third location point.

13. The system of claim 11, wherein the driving evaluator is further configured to:
  compare the driver safety rating to an average driving safety rating associated with an average driver profile;
  determine one or more deviations between the driver safety rating and the average driver safety rating; and
  record in an individual driver profile the one or more deviations.

14. The system of claim 11, wherein the driving evaluator is further configured to:
  identify a map corresponding to a location of travel using the time marked location data;
  generate an illustration of a route of travel using the map and the time marked location data; and
  transmit the illustration to the mobile device for display on a display of the mobile device.

15. The system of claim 11, wherein the driving evaluator is further configured to:
  compare the vehicle acceleration to an acceleration threshold to determine whether the vehicle acceleration exceeds the acceleration threshold; and wherein when the vehicle acceleration exceeds the acceleration threshold, negatively adjusting the driver safety rating.

16. A vehicle data collection and evaluation system comprising:
   a mobile device comprising:
      a locator;
      a time marker;
      a first memory;
      a wireless receiver and wireless transmitter; and
      a first processor;
   wherein the mobile device is configured to:
      collect driving representative data,
      time mark the driving representative data at intervals of up to about two seconds using the time marker,
      store the time marked driving representative data in the first memory, and
      wirelessly transmit the time marked driving representative data;
   wherein the time marked driving representative data comprises at least one of (i) time marked location data; and (ii) time marked speed data, and
   a driving evaluator comprising:
      a second processor;
      a receiver and transmitter, and
      a second memory;
   wherein the driving evaluator is configured to:
      receive the time marked driving representative data transmitted by the mobile device;
      determine hard breaking by using the time marked driving representative data to:
         identify elapsed time between at least two data points from the time marked driving representative data,
         determine a change in speed between the at least two data points,
         calculate vehicle acceleration between the at least two data points based on the change in speed, and
         determine whether the vehicle acceleration is negative and whether the vehicle acceleration exceeds a vehicle acceleration threshold representative of a hard braking event; and
      determine a driver safety rating using the hard braking event.

17. The system of claim 16, wherein the mobile device is a mobile telephone and the driving evaluator is configured to receive the time marked driving representative data from the mobile telephone.

18. The system of claim 16, wherein the system is further configured to associate at least one of the hard breaking event and the driver safety rating with an individual driver profile.

19. The system of claim 16 wherein the driving evaluator is further configured to transmit a notification to a mobile telephone of an authorized recipient that the hard breaking event has occurred.

20. The system of claim 16, wherein the driving evaluator device is further configured to:
   compare the driver safety rating to an average driving safety rating associated with an average driver profile;
   determine deviations between the driver safety rating and the average driver safety rating; and
   record in an individual driver profile the deviations.

* * * * *